United States Patent
Tsuchiya

(10) Patent No.: US 8,046,004 B2
(45) Date of Patent: Oct. 25, 2011

(54) MOBILE TERMINAL WITH LOCATION NOTIFICATION

(75) Inventor: Shinichi Tsuchiya, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1117 days.

(21) Appl. No.: 11/794,420

(22) PCT Filed: Dec. 28, 2005

(86) PCT No.: PCT/JP2005/024095
§ 371 (c)(1),
(2), (4) Date: Jun. 27, 2007

(87) PCT Pub. No.: WO2006/070877
PCT Pub. Date: Jul. 6, 2006

(65) Prior Publication Data
US 2008/0090592 A1   Apr. 17, 2008

(30) Foreign Application Priority Data

Dec. 28, 2004   (JP) .................................. 2004-381358

(51) Int. Cl.
*H04W 4/00* (2009.01)
(52) U.S. Cl. ..................................... 455/456.4; 715/734
(58) Field of Classification Search ............... 455/456.1, 455/456.4; 715/734
See application file for complete search history.

(56) References Cited

U.S. PATENT DOCUMENTS

| 6,169,902 | B1 * | 1/2001 | Kawamoto | ................. | 455/456.4 |
| 6,226,589 | B1 | 5/2001 | Maeda et al. | | |
| 7,168,043 | B2 * | 1/2007 | Shimizu et al. | ............... | 715/734 |
| 2002/0183006 | A1 | 12/2002 | Yasushi et al. | | |

FOREIGN PATENT DOCUMENTS

| JP | 2000-259995 A | 9/2000 |
| JP | 2002-77975 A | 3/2002 |
| JP | 2002-158776 A | 5/2002 |
| JP | 2002-353976 A | 12/2002 |
| JP | 2004-48357 A | 2/2004 |
| JP | 2004-201218 A | 7/2004 |
| JP | 2004-215079 A | 7/2004 |
| JP | 2004-343346 A | 12/2004 |

* cited by examiner

*Primary Examiner* — William D Cumming
(74) *Attorney, Agent, or Firm* — Birch, Stewart, Kolasch & Birch, LLP

(57) ABSTRACT

The level of detail of position information about one's own location is expressed in terms of a disclosure level when announcing one's own location so as to prevent the supply of more information about oneself to the other party than is necessary. A mobile terminal 10 determines, based on a disclosure level L determined with respect to the specific other party, time band, or located area, and based on the provision of location information about the current location or map information that includes such location, generates location information or location display map information, which is transmitted to a communications terminal 50 of other party B, in accordance with the disclosure content specified by disclosure levels L02 to L05.

22 Claims, 12 Drawing Sheets

FIG. 3

| L: DISCLOSURE LEVEL | D01: LOCATED AREA (IN WORDS) | D02: DISPLAY MAP (IN DIVIDED AREAS) | D03: LOCATION DISPLAY (IN CONCENTRIC CIRCLES) |
|---|---|---|---|
| L05 | PINPOINT | PINPOINT | AT PINPOINT LEVEL IN A COMMUNITY |
| L04 | COMMUNITY LEVEL (e.g., 4-chome, Hongo, Bunkyo Ward, Tokyo) | CIRCLE WITH A DIAMETER OF 100 m | COMMUNITY LEVEL (e.g., divided area of 4-chome, Hongo) |
| L03 | MUNICIPAL LEVEL (e.g., Bunkyo Ward, Tokyo) | CIRCLE WITH A DIAMETER OF 1 Km | MUNICIPAL LEVEL (e.g., divided ward of Bunkyo) |
| L02 | PREFECTURAL LEVEL (e.g., Tokyo) | CIRCLE WITH A DIAMETER OF 20 Km | PREFECTURAL LEVEL (e.g., divided area of Tokyo) |
| L01 | Undisclosed | Undisclosed | Undisclosed |

FIG. 4

| OTHER PARTY : B | OTHER-PARTY-BASED DISCLOSURE LEVEL | TIME-BAND-BASED DISCLOSURE LEVEL | | LOCATED-AREA-BASED DISCLOSURE LEVEL | |
|---|---|---|---|---|---|
| B01 | L04 | – | – | – | – |
| B02 | L03 | – | – | – | – |
| B03 | L02 | – | – | – | – |
| B04 | L01 | – | – | – | – |
| B05 | – | 09:00~18:00<br>00:00~08:59, 18:00~24:00 | L04<br>L01 | – | – |
| B06 | – | (MON-FRI) 09:00~18:00<br>(MON-FRI) 00:00~08:59, 18:00~24:00<br>(SAT-SUN) 00:00~24:00 | L03<br>L01<br>L01 | – | – |
| B07 | – | – | – | WITHIN TOKYO<br>OTHER | L04<br>L05 |
| B08 | L01 | – | – | WITHIN TOKYO | L04 |

FIG. 6

| | 28-1 | 28-2 | 28-3 | 28-4 28 |
|---|---|---|---|---|
| | RECEPTION TIME RECORDING COLUMN | REQUEST TRANSMITTING SOURCE ID RECORDING COLUMN | REQUESTED DISCLOSURE LEVEL RECORDING COLUMN | DETERMINED DISCLOSURE LEVEL RECORDING COLUMN |
| | 2004.12.15 19:00 | B01 | L04 | L04 |
| | 2004.12.15 17:00 | B04 | L03 | L01 |
| | 2004.12.15 16:40 | B03 | L02 | L02 |
| | 2004.12.15 16:10 | B07 | L04 | L01 |
| | | | | |

MOBILE TERMINAL WITH LOCATION NOTIFICATION

TECHNICAL FIELD

The present invention relates to a mobile terminal equipped with a communications function and capable of indicating the location thereof using the GPS (Global Positioning System) or the like, a communications terminal capable of communicating with such mobile terminal, a location notifying system using such terminals, and a location notifying method.

BACKGROUND ART

As a result of the spread of mobile terminals in recent years, technologies have also been devised and made available for practical applications that enable the user of a mobile terminal to provide a notification about his or her location or to identify the location of another person.

Portable terminals are encouraged to be equipped with a location identifying system utilizing the GPS so that, particularly in case of emergency, the police station, fire department, hospital or the like can be notified of your own location accurately.

However, from the viewpoint of privacy of the user of such mobile terminal, it is not preferable if the location of the user can be identified unilaterally and unconditionally through a predetermined procedure on the part of the other party.

In consideration of such circumstances surrounding the user, JP Patent Publication (Kokai) No. 2002-077975 A discloses a position information notification system whereby monitoring of the location of a mobile terminal (personal handyphone system as a mobile communications terminal) is allowed on the condition that such monitoring takes place only within a predetermined area and that there is prior permission from the user of the mobile terminal.

JP Patent Publication (Kokai) No. 2002-353976 A discloses a mobile terminal (a wrist band sensor as an information communications device) equipped with a GPS (Global Positioning System) receiver. The type of information that is disclosed, including the position information about the mobile terminal acquired through its GPS receiver, and other various information retained or acquired by the mobile terminal, is set depending on the party on the other end of communication.

The above prior art examples are both merely capable of selecting whether or not the other party should be given the position information indicating the location of the user. Neither example is capable of setting the level of detail (such as the granularity of the position information given to the other party, or the frequency of such notice) of the position information indicating one's own location to the other party.

The following are examples related to the above technologies.

Patent Document 1: JP Patent Publication (Kokai) No. 2002-077975 A

Patent Document 2: JP Patent Publication (Kokai) No. 2002-353976 A

In such mobile terminals equipped with a communications function and capable of identifying one's own location, even when the other party is to be given the position information about the location of one's own, there are cases where such position information should be detailed or elaborate, and cases where such position information should not be detailed.

Thus, in mobile terminals equipped with a communications function and capable of identifying the location of one's own, there is a strong need to change the level of detail of the position information about one's own location to be given to the other party depending on the degree of intimacy with the other party.

However, the aforementioned conventional techniques are merely capable of selecting whether or not the other party should be notified of the location of one's own. They send to the other party position information about the location of one's own that is more elaborate than necessary, even when there is no need to send such elaborate position information about one's own location, thus resulting in a failure to ensure the protection of privacy. The technologies could be modified such that, whenever the other party is to be notified of one's own location, general position information is transmitted instead of elaborate position information about one's own location so as to protect privacy. In this case, however, problems may arise when such notification is for emergency purposes, such as when notifying a police station, fire department, or hospital or the like, which would require elaborate position information.

Furthermore, even for the same party, there may be cases where the user does not mind letting the other party have position information indicating his or her location, and cases where the user does mind doing so, depending on the location of the user or time. For example, from the viewpoint of protection of privacy, in some cases it may be preferable to keep secret from someone you are having a business relationship with position information indicating the location of one's own house or one's location during non-working hours.

In such cases, the aforementioned conventional techniques are incapable of selecting whether or not the other party should be notified of the location of the user depending on the location of the user or the time band including the day of the week. If the other party should be notified of such information, they are incapable of selecting the level of detail of such position information. Thus, the conventional techniques are problematic from the viewpoint of protection of privacy.

In view of the aforementioned problems of conventional art, it is an object of the invention to provide a mobile terminal, a communications terminal, a location notifying system using such terminals, and a location notifying method, whereby, when notifying the other party of the user's current location, the level of detail of position information indicating the user's location is indicated in terms of disclosure levels. When notifying the other party of position information indicting the user's location, such notification is made with a disclosure level that is set depending on the other party, so that the other party is prevented from acquiring more information than is necessary about the user's location.

It is another object of the invention to provide a mobile terminal, a communications terminal, a location notifying system using such terminals, and a location notifying method whereby, even for the same party, the position information indicating the user's location that is not notified to the other party is controlled depending on the location of the user or the time band, so that the other party is prevented from acquiring more information about the user's location than is necessary.

SUMMARY OF THE INVENTION

In order to achieve the aforementioned objects, the invention provides a mobile terminal having a communications function, comprising:

one's own terminal position information acquiring means for acquiring position information about one's own terminal;

disclosure level determination means for determining the disclosure level of the position information about one's own terminal that is acquired by the one's own terminal position information acquiring means; and output means for outputting the position information about one's own terminal to an other party's terminal in accordance with the disclosure level determined by the disclosure level determination means.

The invention also provides a mobile terminal having a communications function, comprising:

one's own terminal position information acquiring means for acquiring position information about one's own terminal;

disclosure level determination means for determining the disclosure level of the position information about one's own terminal in accordance with the located area of one's own terminal based on the position information about one's own terminal acquired by the one's own terminal position information acquiring means; and output means for outputting the position information about one's own terminal to an other party's terminal in accordance with the disclosure level determined by the disclosure level determination means.

The invention also provides a mobile terminal having a communications function, comprising:

one's own terminal position information acquiring means for acquiring position information about one's own terminal;

disclosure level determination means for determining the disclosure level of the position information about one's own terminal, which is acquired by the one's own terminal position information acquiring means, depending on a time band; and output means for outputting the position information about one's own terminal to an other party's terminal in accordance with the disclosure level determined by the disclosure level determination means.

The invention also provides a communications terminal capable of communicating with a mobile terminal having a communications function, comprising:

other party's position information acquiring means for acquiring the position information about the other party's terminal based on a disclosure level supplied from the other party's terminal; and other party's terminal position identifying means for outputting a notification about the position information about the other party's terminal based on the disclosure level acquired by the other party's position information acquiring means.

The invention also provides a location notifying system for causing a communications terminal to output a notification about the location of a mobile terminal with which the communications terminal can communicate, comprising:

mobile terminal position acquiring means for acquiring position information about the mobile terminal based on an instruction from either the mobile terminal or the communications terminal;

notified disclosure level determination means for determining, regarding the position information about the mobile terminal acquired by the mobile terminal position acquiring means, the disclosure level at which the communications terminal is caused to output a notification; and notified position information generating means for generating notified position information about the mobile terminal about which a notification is outputted by the communications terminal based on the disclosure level determined by the notified disclosure level determination means.

The invention further provides a location notifying method comprising:

one's own terminal position information acquiring step for acquiring position information about a mobile terminal having a communications function;

disclosure level determination step for determining the disclosure level of position information about one's own terminal that is acquired in the one's own terminal position information acquiring step; and output step for outputting the position information about one's own terminal to an other party's terminal based on the disclosure level determined in the disclosure level determination step.

BRIEF DESCRIPTION OF THE DRAWINGS

FIG. 3 is a chart for the explanation of an example of the disclosure levels in the mobile terminal according to the present embodiment.

FIG. 4 shows an example of a disclosure level registration table in the mobile terminal of the present embodiment.

FIG. 6 shows a chart for the description of a history storage memory formed in a volatile memory in the mobile terminal of the present embodiment.

BEST MODE OF CARRYING OUT THE INVENTION

A mobile terminal and a communications terminal capable of communicating with the mobile terminal according to an embodiment of the invention will be described with reference to the drawings.

Figure 1:
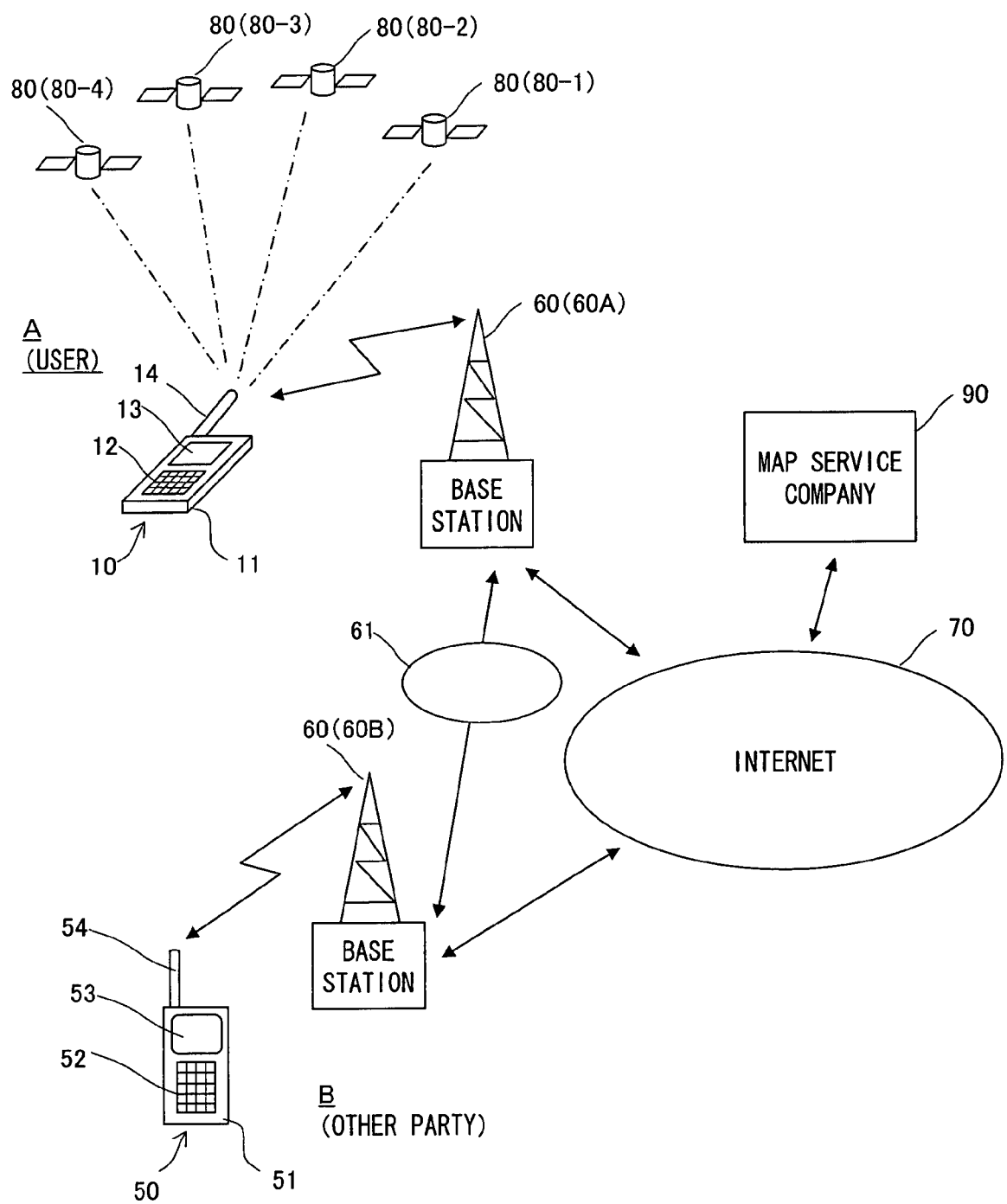
FIG. 1 shows the system configuration of a location notifying system including a mobile terminal according to the invention and a communications terminal capable of communicating with the mobile terminal.

FIG. 1 shows a location notifying system comprised of a mobile terminal and a communications terminal capable of communicating with the mobile terminal.

A mobile terminal 10 according to the present embodiment includes a main body 11, an operating unit 12 and a display unit 13 housed therein, and an antenna unit 14, for example. The operating unit 12 includes a key for designating transmission or reception, keys for the entry of numerals and characters, keys for instructing the acquisition of position information about the other party or the supply of position information to the other party, and keys for instructing the taking of a photo or creation of mail, for example. The display unit 13 includes a monitoring display unit comprised of an LCD (Liquid Crystal Display) or an ELD (Electro Luminescence Display). It is capable of displaying various information such as position information.

The mobile terminal 10 is wirelessly connected, via an antenna unit 14, to a base station 60 (60A) of a carrier. The mobile terminal 10 is equipped with a communications function allowing it to communicate, via the base station 60 and through a carrier's network 61 or the Internet 70, with a communications terminal 50 of a party B. In the illustrated example, for the sake of simplifying the explanation, the carrier is assumed to double as an ISP (Internet Service Provider).

The mobile terminal 10 is also equipped with a GPS positioning function whereby, in order to acquire one's own location, i.e., the location of user A who has the mobile terminal 10, a signal emitted by each of GPS satellites 80 (80-1 to 80-4) is received by the antenna unit 14 and, depending on the state of reception of these emitted signals from the GPS satellites 80, the position information about user A is acquired.

While in the illustrated example the communications terminal 50 of other party B is described with reference to a mobile communications terminal similar to the mobile terminal 10 of user A for the sake of explanation, it may be a fixed communications terminal. In the figure, numerals 52 and 53 designate an operating unit and a display unit, respectively, provided in the main body 51 of the communications terminal 50.

In the present embodiment, the mobile terminal 10 and the communications terminal 50 are each comprised of a mobile telephone device, for example. Between the mobile terminal 10 and the communications terminal 50, a call can be made and information can be transmitted via the carrier's base station 60 (60A, 60B) or the network 61. Further, the mobile terminal 10 and the communications terminal 50 are each connectable to the Internet 70 via the base station 60.

In accordance with the present embodiment, a map service company 90 is connected to the Internet as a content provider, which, upon demand, provides a map of an area corresponding to desired position information and location information to a party requesting such information.

In the following, the structure of the mobile terminal 10 is described with reference to FIG. 2.

Figure 2:
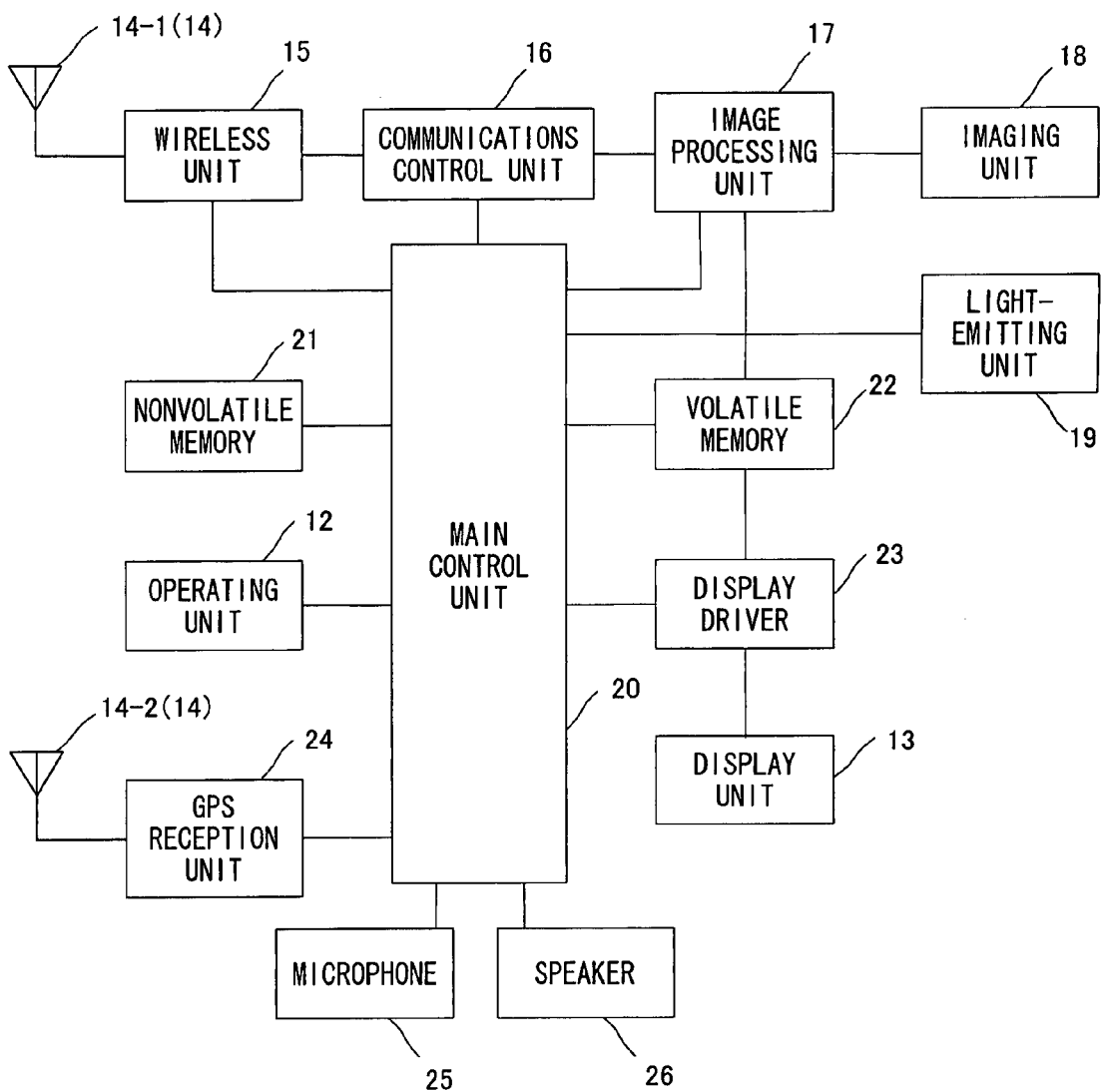
FIG. 2 shows the configuration of a mobile terminal according to an embodiment of the invention.

FIG. 2 shows a system configuration of the mobile terminal according to the present embodiment.

The antenna unit 14 of the mobile terminal 10 according to the present embodiment includes a wireless communications antenna 14-1 for a call and data transmission, and a GPS reception antenna 14-2 for receiving a transmission signal from each of the GPS satellites 80.

The wireless communications antenna 14-1 is used for transmitting and receiving a wireless signal to and from the base station 60. The wireless unit 15, during reception, demodulates a wireless reception signal received from the base station 60 via the wireless communications antenna 14-1, and then feeds a demodulated reception signal to a communications control unit 16. During transmission, the wireless unit 15 modulates and amplifies a transmission signal sent from the communications control unit 16 and then transmits a wireless transmission signal to the base station 60 via the wireless communications antenna 14-1.

The communications control unit 16 performs a call or data reception process by demodulating the reception signal demodulated by the wireless unit 15 in accordance with a predetermined communications protocol. The communications control unit 16 feeds the acquired reception data addressed to the user's terminal to the main control unit 20. The communications control unit 16 also encodes transmission data supplied from the main control unit 20 or an image processing unit 17 in accordance with a predetermined communications protocol, and then feeds a thus generated transmission signal to the wireless unit 15.

The main control unit 20, based on a control program stored in a non-volatile memory (ROM) 21, controls the individual parts of the system, such as the aforementioned wireless unit 15 and the communications control unit 16, and performs various control processes.

For example, the main control unit 20, upon detection of reception of a call by the communications control unit 16, causes a light-emitting unit 19 to blink, and then converts the ring tone data stored in a volatile memory (RAM) 22 into a voice signal, which is then outputted by a speaker 26, for example, thus controlling the call reception notifying process.

The main control unit 20 also performs a reception control process. For example, based on a call reception operation (off-hook) or the like made by the operating unit 12, the main control unit 20 separates the acquired reception data fed from the communications control unit 16 into voice data and other data including image data and character data. The main control unit 20 converts the thus separated voice data into a voice signal, which is then outputted via the speaker 26. The main control unit 20 may also store the separated image data and other data including character data in the volatile memory (RAM) 22. Furthermore, the main control unit 20 may control a display driver 23 so as to cause the reception image data or the received character data or the like stored in the volatile memory (RAM) 22 to be displayed on the display unit 13.

Furthermore, the main control unit 20 performs a transmission control process. For example, the main control unit 20 converts a voice signal entered via a microphone 25 into voice data, or it extracts data other than voice data, such as image data and character data, that is to be transmitted from such data other than voice data stored in the volatile memory 22, and then multiplexes such voice data and non-voice data that are to be transmitted, thus creating transmission data, which it then feeds to the communications control unit 16.

The main control unit 20 also performs a photography control process by controlling the image processing unit 17 based on a photography operation performed on the operating unit 12. The image processing unit 17 is connected to an imaging unit 18 equipped with an imaging lens, an imaging device, and so on. The image processing unit 17 converts an imaged signal of a subject, which is outputted from the imaging unit 18, into a digital signal, performs an interpolation process or the like on the pixels, and then generates image data. The image processing unit 17, based on a control instruction from the main control unit 20, outputs such generated image data to the communications control unit 16 as transmission data, or have it stored in the volatile memory (RAM) 22.

Furthermore, in accordance with the present embodiment, the main control unit 20, based on an instruction or the like from the operating unit 12, performs a position information process.

In the following, a process for acquiring the position of one's own terminal, which is one of the processes included in the position information process performed by the main control unit 20, is described first.

In the process for acquiring the position of one's own terminal in accordance with the present embodiment, the main control unit 20, regardless of whether or not in communication with the other party, activates and controls a GPS reception unit 24, in response to an operation on the operating unit 12 on one's own terminal instructing a confirmation or reporting of position information about the terminal, so as to acquire current positioning data about one's own terminal. In this way, the GPS reception unit 24 acquires the current position data, which is represented in terms of the longitude and latitude of the location of the terminal, using a transmission signal from each of the multiple GPS satellites 80 received by the GPS reception antenna 14-2 in the antenna unit 14. The thus acquired current position data is fed from the GPS reception unit 24 to the main control unit 20 as the current positioning data.

The main control unit 20, based on the positioning data acquired from the GPS reception unit 24, then generates a request for the acquisition of the location of its own terminal or corresponding map information, i.e., the position information about the mobile terminal 10. Then, the main control unit 20 causes the communications control unit 16 and the wireless unit 15 to transmit such request to the base station 60 via the communications antenna 14-1. Such request for the acquisition of position information is allowed to be transmitted from the mobile terminal 10 to the base station 60, even when user A of the mobile terminal 10 is communicating with user B of another communications terminal 50. Specifically, such request can be transmitted together with the transmission data that is transmitted from the mobile terminal 10 of user A to the base station 60 for the communications terminal 50 of user B.

In the location notifying system shown in FIG. 1, the base station 60, upon reception of a request for the acquisition of position information from the mobile terminal 10, accesses, via the Internet 70, a position information search server (not shown) of the map service company 90 as a content provider. The base station 60 then transmits a request to the map service company 90 for the transmission of location information corresponding to the positioning data included in the request for acquisition of position information from the mobile terminal 10, or map information indicating the corresponding location. The position information search server of the map service company 90, based on the positioning data about the mobile terminal 10 included in the transmission request received from the base station 60, searches for the location information about the current position of the mobile terminal 10 or map information including its location, and then sends the information obtained by the search to the base station 60 from which the transmission request was received, via the Internet 70. The base station 60, upon reception of the reply from the map service company 90 that indicates the location information corresponding to the request for acquisition of position information from the mobile terminal 10 or the map information including such location, transmits a reply to the mobile terminal 10, from which the acquisition request was received, in the form of the location information acquired from the map service company 90 or the map information including such location. Such location information or the map information including such location is allowed to be transmitted from the base station 60 to the mobile terminal 10 even when user A of the mobile terminal is communicating with user B of another communications terminal 50. Specifically, the location information or the map information can be transmitted together with the transmission data that is transmitted from the communications terminal 50 of user B to the mobile terminal 10 of user A base station 60 via the base station 60.

The main control unit 20 of the mobile terminal 10, upon detecting the reception of the location information about the mobile terminal 10 included in the reception data received by the aforementioned wireless unit 15 and the communications control unit 16 from the base station 60, or the map information including such location, in response to the operation performed to instruct the confirmation or reporting of the position information about the terminal, stores such information in the volatile memory (RAM) 22, and then completes the process for acquiring the position of one's own terminal.

Next, a process for setting the disclosure level of the position information about one's own terminal that is disclosed to party B, which process is one of the various processes included in the position information process performed by the main control unit 20, will be described.

In the mobile terminal 10 according to the present embodiment, a disclosure level L can be set as a parameter for defining the level of detail (i.e., the granularity of the position information that is given to the other party, or the frequency of such notice) when notifying other party B of position information about one's own terminal, by a predetermined setting operation performed on the operating unit 12. Disclosure level L may be determined depending on each communications terminal 50 of party B, each time band or located area that is set and registered, or an appropriate combination of the communications terminal 50, the time band, and the located area.

FIG. 3 shows an example of the disclosure level in a mobile terminal according to the present embodiment.

In accordance with the present embodiment, the mobile terminal 10 can be set and registered with five disclosure levels L, L01 to L05 as shown in FIG. 3, as a parameter for defining the level of detail of the position information about one's own terminal of which other party B is notified.

As the disclosure level L moves from level L01 to level L05, the level of detail of the position information about one's own terminal of which other party B is notified increases.

For example, level L01 is the lowest level of one's own position information of which other party B is notified. At this level, one's own location (display of address) D01, of which other party B is notified, is not disclosed. Display map D02 for displaying divided areas including the location is not disclosed either. Nor is location display D02, which shows one's own location on the map in a perfect circle, for example, is disclosed.

Level L02 is the second lowest level at which location D01 is disclosed at the prefectural level, display map D02 is that of the prefectural levels, and location display D03 is shown with a perfect circle having a diameter of 20 Km. Level L03 is such a level that location D01 is disclosed at the municipality level, display map D02 is that of the municipality level, and location display D03 is shown with a perfect circle having a diameter of 1 Km. At level L04, location D01 is disclosed at the community level, display map D02 is that of the community level, and location display D03 is made with a perfect circle having a diameter of 100 m. At level L05, which is the most detailed disclosure level L, location D01 is disclosed on a pin-point basis within the community level, display map D02 is a detailed map at the community level, and location display D03 is made on a pin-point basis based on the positioning level provided by the GPS reception unit 24

In the case of the mobile terminal 10 according to the present embodiment, based on a predetermined setting operation performed by user A on the operating unit 12 in advance, the disclosure levels L defined as described above are backed up in the non-volatile memory (ROM) 21 or the volatile memory (RAM) 22 with respect to each communications terminal 50 of other party B, with respect to the time band or the located area that is set and registered in advance, or with respect to an appropriate combination of the communications terminal 50, time band, and located area, and can be registered in the form of a disclosure level registration table.

FIG. 4 shows an example of the disclosure level registration table in the mobile terminal according to the present embodiment.

In the disclosure level registration table 27 shown in FIG. 4, for other parties B01 to B04, disclosure level L is set and registered with respect to each party. For other parties B05 and B06, disclosure level L is set and registered with respect to each time band. For other party B07, disclosure level L is set and registered with respect to each located area. For other party B08, a combination of disclosure level L for each party and disclosure level L for each located area is set and registered as disclosure level L.

Regarding the method of setting and registering disclosure level L in the disclosure level registration table using the operating unit 12, the mobile terminal 10 of the present embodiment is adapted for various methods. For example, the disclosure level may be automatically set and registered with respect to each party B, regardless of party B, or in accordance with the disclosure level L of the position information about other party B of which user A is notified. The details of such methods, however, are omitted herein.

Hereafter, among the various processes included in the position information process performed by the main control unit 20, the process for determining disclosure level L for other party B, and the process for outputting the position information about one's own terminal to the communications terminal 50 of the other party based on the thus determined disclosure level L will be described, referring to a case where user A communicates with other party B. In the following description, it is assumed that the communications terminal 50 of other party B also has a system configuration similar to that of the aforementioned mobile terminal 10 shown in FIG. 2.

Figure 5:
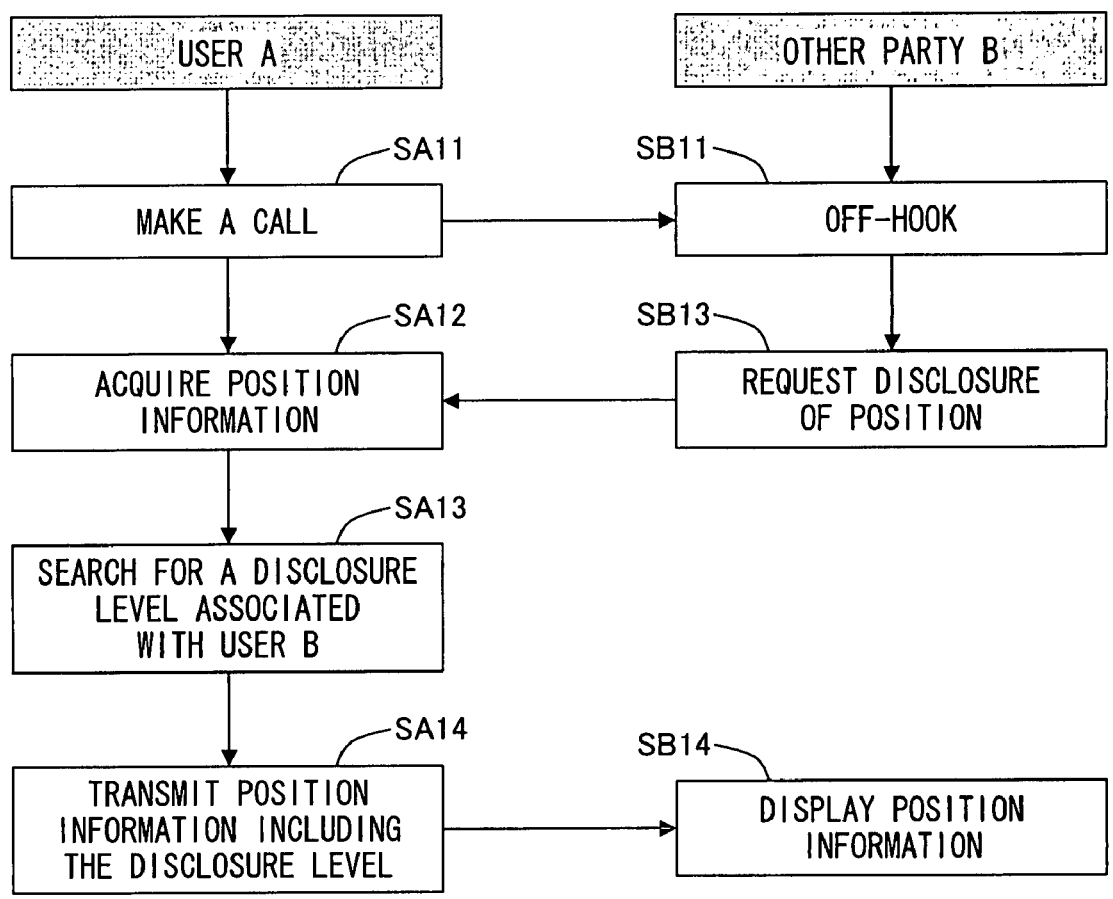
FIG. 5 shows a flowchart for the description of an example of transmission and reception between mobile terminals according to the present embodiment.

FIG. 5 shows a flowchart for the explanation of an example of the transmission and reception of position information between terminals using the mobile terminal according to the present embodiment.

In the case illustrated in FIG. 5, user A is communicating with other party B. Upon reception of a disclosure request from other party B for the position information about user A, user A accepts the disclosure request from other party B and outputs the position information about its own mobile terminal 10 to the communications terminal 50 of user B.

In this case, user A, operating the operating unit 12, enters the telephone number of the communications terminal 50 of other party B, and carries out an call-initiating operation (off-hooking) (step SA11). In the mobile terminal 10, the main control unit 20 generates transmission data including a call request with respect to the telephone number of the communications terminal 50. The communications control unit 16 then wirelessly transmits a transmission signal to the base station 60A (see FIG. 1) that has been cell-searched, via the wireless unit 15 and the wireless communications antenna 14-1.

The base station 60A, upon wireless reception of the transmission data from the mobile terminal 10 that includes a call request, transfer the call request with the telephone number for the communications terminal 50 to the base station 60B of other party B. The base station 60B in turn transmits a transmission signal including a call to the communications terminal 50 wirelessly. Upon wireless reception of the transmission signal from the base station 60B that includes a call, the communications terminal 50 transmits a transmission signal including a call response to the base station 60B wirelessly, after a transmission/reception start operation (off-hooking) is performed by other party B (step SB11). As a result, a line-connected state is established via the base stations 60A and 60B between the mobile terminal 10 and the communications terminal 50 such that telephone conversation and data communications can be conducted between them.

When the mobile terminal 10 and the communications terminal 50 are placed in the line-connected state, the communications terminal 50 of the present embodiment automatically transmits, based on the setting on the operating unit 52 of other party B that is made in advance, a disclosure request to the mobile terminal 10 for position information in response to the reception of the call from the mobile terminal 10. The communications terminal 50, when transmitting the disclosure request to the mobile terminal 10 for position information, can also transmit a request for its disclosure level L (see FIG. 4) as needed.

As the disclosure request for position information made by other party B is received by the mobile terminal 10 that is connected on line, the main control unit 20 of the mobile terminal 10 stores the request in the history storage memory 28, which is backed up by the non-volatile memory (ROM) 21 or the volatile memory (RAM) 22. At the same time, the main control unit 20 controls the display driver 23 so as to cause the display unit 13 to display the fact that there has been a disclosure request from the communications terminal 50 of other party B for position information and, if there is also the concurrent request for the disclosure level L, any of the requested disclosure level L01 to L05.

FIG. 6 is a chart for the description of a history storage memory formed in the non-volatile memory (ROM) 21 or the volatile memory in the mobile terminal according to the present embodiment.

In the present embodiment, a history storage memory 28 includes a reception time recording column 28-1 for storing the time (order) of reception of disclosure requests for position information from the communications terminal 50 of other party B; a request transmitting source ID recording column 28-2 for storing the ID (such as the telephone number) of other party B from which the disclosure request has originated, i.e., the communications terminal 50; a requested disclosure level recording column 28-3 for storing the disclosure levels L01 to L05 included in the disclosure requests; and a determined disclosure level recording column 28-4 for storing the disclosure levels L01 to L05 that are determined on the part of the mobile terminal 10 as will be described later.

Alternatively, the data about disclosure level L may be retained among the telephone book data in the mobile terminal (cell phone) 10 of user A in data form. In this way, the user can be prompted to enter and set disclosure level L of the aforementioned kind when entering telephone book data. Further, this also makes it easy to set disclosure levels L uniformly with respect to individuals in telephone book data, such as on a group-by-group basis.

The main control unit 20 of the mobile terminal 10, upon reception of a disclosure request from other party B for its position information, performs a process for acquiring its own position information (step SA12), a process for determining the disclosure level of its own position information with respect to the other party B (step SA13), and a process for outputting its own position information to the other party's terminal 50 based on the thus determined disclosure level (step SA14).

In the process for acquiring the position information of its own (step SA12), the main control unit 20 of the mobile terminal 10 acquires its current positioning data from the GPS reception unit 24, and then, based on the positioning data, generates a request for the acquisition of the location information about the mobile terminal 10 or its map information, i.e., a request for the acquisition of its own position information.

Then, the main control unit 20 of the mobile terminal 10, in the process for determining the disclosure level of its own position information with respect to other party B (step SA13), determines whether or not the other party B, from which the disclosure request has originated, that is included in the disclosure request, for example, or other party B corresponding to the ID of the communications terminal 50, is registered in the disclosure level registration table 27 shown in FIG. 4.

Further, the main control unit 20 of the mobile terminal 10 determines whether or not a request concerning disclosure level L is included in the disclosure request received from other party B.

If the other party B from which the disclosure request originated or the ID of its communications terminal 50 is not registered in the disclosure level registration table 27, the main control unit 20 of the mobile terminal 10 terminates the request for acquiring the location of the mobile terminal 10 itself based on the positioning data or its map information (i.e., a request for the acquisition of the position information about the mobile terminal 10), which request is made to the base station 60A as will be described above. The main control unit 20 also terminates the process for outputting the position information about its own terminal to the other party's terminal 50. In this way, the main control unit 20 prevents the position information about the mobile terminal 10 itself from being transmitted to the other party B.

If, on the other hand, the ID of the other party B from which the disclosure request has originated or that of the communications terminal 50 is registered in the disclosure level registration table 27, the main control unit 20 of the mobile terminal 10, in accordance with the disclosure level that is registered in the disclosure level registration table 27 in association with the ID of the other party B or its communications terminal 50, tentatively determines the disclosure level of the position information about the mobile terminal 10 itself that is transmitted to the other party B.

Then, the main control unit 20 of the mobile terminal 10, when no request concerning disclosure level L is included in the disclosure request received from other party B, or, even when a request concerning disclosure level L is included in the disclosure request received from other party B, if the tentatively determined disclosure level L corresponds to the disclosure level L included in the disclosure request, determines the tentative disclosure level as a final disclosure level L of the position information about the mobile terminal 10 itself that is actually transmitted to the other party B. The main control unit 20 then controls the display driver 23 so as to cause the finally determined disclosure level L to be displayed on the display unit 13.

On the other hand, the main control unit 20 of the mobile terminal 10 in accordance with the present embodiment, when a request concerning disclosure level L is included in the disclosure request received from other party B, if the tentative disclosure level L does not correspond to the disclosure level L included in the disclosure request, controls the display driver 23 so that the display unit 13 displays a message to the effect that the both disclosure levels do not correspond and therefore user A needs to perform an operation to set the disclosure level L using the operating unit 12.

Thus, in this case, based on the both disclosure levels L displayed on the display unit 13 and the message concerning the operation for setting the disclosure level L, user A confirms the disclosure level L of the position information about the mobile terminal 10 itself that is actually transmitted to other party B and then re-enters the setting. The main control unit 20 of the mobile terminal 10, upon the re-entry and re-setting of a desired disclosure level L by user A on the operating unit 12, determines that this is the final disclosure level L of the position information about the mobile terminal 10 itself that is actually transmitted to the other party B, and controls the display driver 23 so as to have the finally determined disclosure level L be displayed on the display unit 13.

In the foregoing embodiment, if the tentative disclosure level L does not correspond to the disclosure level L included in the disclosure request, user A re-enters and re-sets the disclosure level L on the operating unit 12. However, this is merely an example, and the embodiment may be modified such that, for example, from the viewpoint of protection of privacy, a disclosure level L with a lower value is automatically selected as the disclosure level L of the position information about the mobile terminal 10 itself that is actually transmitted to other party B, and then controls the display driver 23 so as to have it displayed on the display unit 13 as the finally determined disclosure level L.

When it is determined that the disclosure level L determined for the position information about the mobile terminal 10 itself that is actually transmitted to other party B is other than disclosure level L01, i.e., if the position information about the mobile terminal 10 itself is not to remain undisclosed, the main control unit 20 of the mobile terminal 10, in a process for acquiring the position of one's own terminal, transmits a request for the acquisition of the position information about the mobile terminal 10 itself that it generated to the base station 60A. The main control unit 20 then receives, via the base station 60A, from the map service company 90, location information about its current location or map information including such location (step SA12). On the other hand, if it is determined that the disclosure level is L01, i.e., if the position information about the mobile terminal 10 itself is not to be disclosed, the main control unit 20 terminates the position information process without being supplied with the location information about the current location or the map information including such location from the map service company 90, and without actually performing the process for outputting the position information about its own terminal to the other party's terminal 50. In this way, the main control unit 20 prevents the position information about the mobile terminal 10 itself from being transmitted to the other party B.

The mobile terminal 10, based on the finally determined disclosure level L and the map information supplied from the map service company 90 concerning the location information about the current location or the map information including such location, performs the process for outputting its own position information to the other party's terminal 50 (step SA14).

FIGS. 7 to 10 show examples of the location information and the location display map information generated on the basis of the disclosure level.

In these examples, it is assumed that user A having the mobile terminal 10 is currently positioned at 4-#-# Hongo, Bunkyo Ward, Tokyo.

Figure 7:
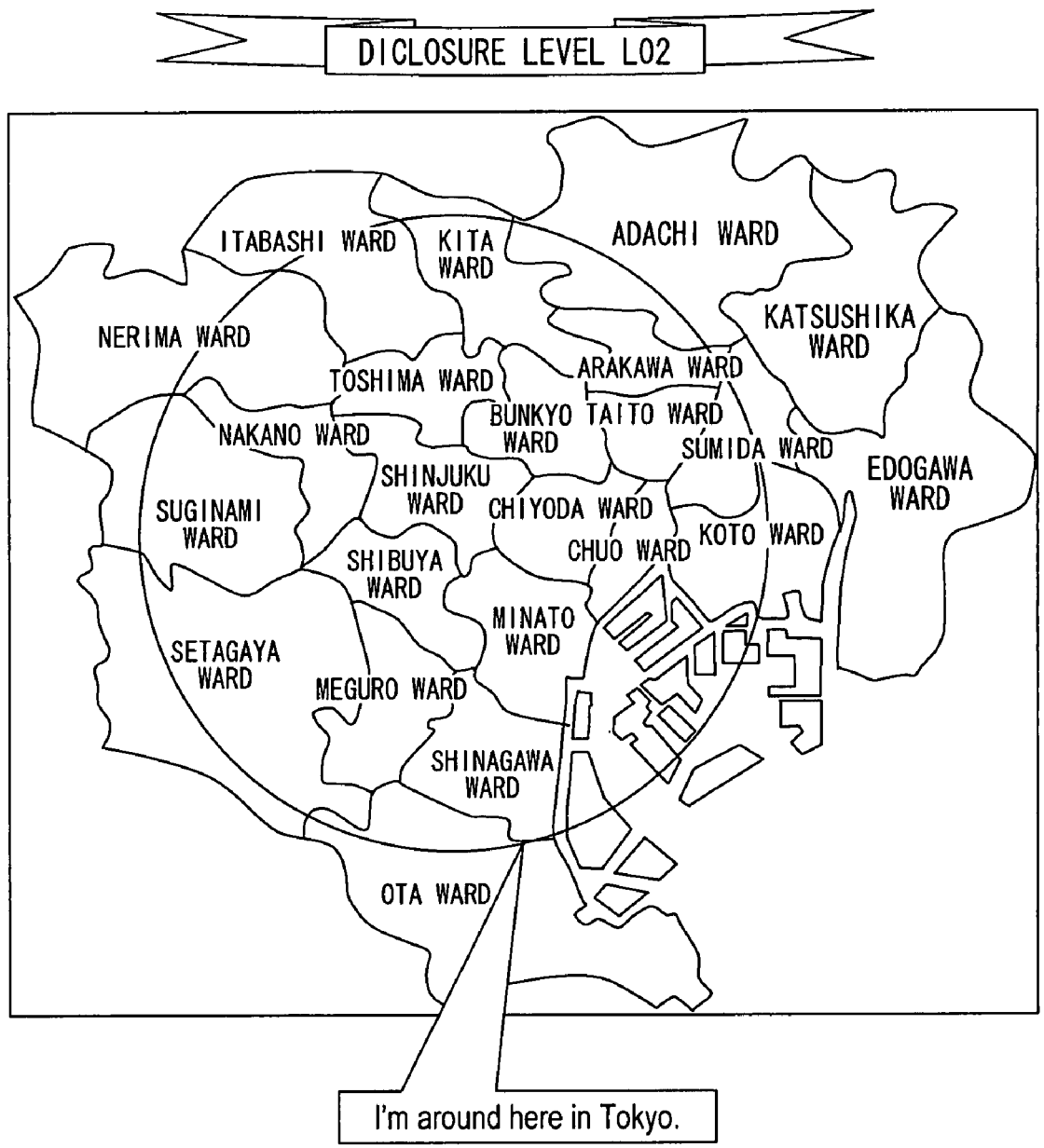
FIG. 7 shows a chart for the description of an example of location information and location display map information that are generated based on a disclosure level according to the present embodiment.

FIG. 7 shows a case where the finally determined disclosure level L is L02, i.e., on the prefectural level, showing the location information and the location display map information to be transmitted to the communications terminal 50 of other party B. In this case, the main control unit 20 of the mobile terminal 10, based on the data about the current location information or the map information including such location that is stored in the volatile memory (RAM) 22, generates location information to be transmitted, such as "Tokyo," for example, where the rest of the address, i.e., "4-#-# Hongo, Bunkyo Ward" is omitted. The main control unit 20 also generates location display map information indicating a circular located region with a diameter corresponding to 20 Km on a map of Tokyo with its divided areas in which the address "4-#-# Hongo, Bunkyo Ward, Tokyo" is covered. The main control unit 20 stores such information in the volatile memory (RAM) 22 as transmission location information and transmission location display map information, respectively, and then controls the display driver 23 so as to have such information displayed on the display unit 13, so that user A can determine whether or not there is any problem concerning such content in terms of privacy, for example. Alternatively, for such confirmation made by user A, the current location of user A may be displayed in a pin-point manner at the same time such that user A can compare it with the transmission location information and the transmission location display map information for easier confirmation.

If there is no problem, in response to a predetermined operation by user A on the operating unit 12, or after the passage of a predetermined time since the aforementioned display is made, the main control unit 20 of the mobile terminal 10 processes the transmission location information and the transmission location display map information into multiplexed transmission data apart from the voice data, and supplies it to the communications control unit 16 so that it is transmitted from the wireless communications antenna 14-1 via the wireless unit 15.

Figure 8:
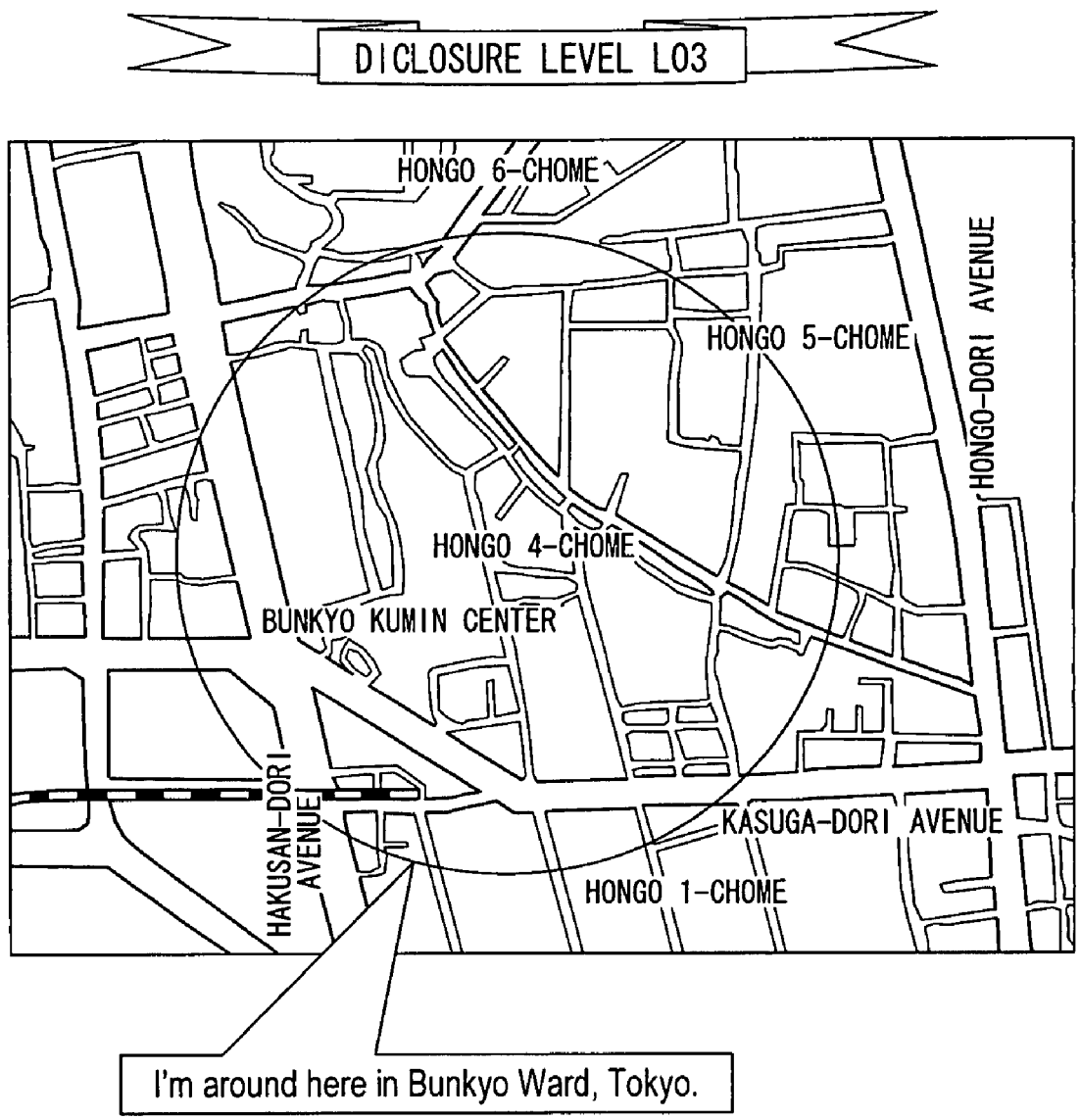
FIG. 8 shows a chart for the description of an example of location information and location display map information that are generated based on a disclosure level according to the present embodiment.

Similarly, FIG. 8 shows an example where the finally determined disclosure level L is L03, i.e., on the municipality level. In this example, location information to be transmitted, such as "Bunkyo Ward, Tokyo," in which "4-#-# Hongo" is omitted, is generated, and also location display map information to be transmitted is generated that shows a circular location region with a diameter corresponding to 1 Km on a map of Bunkyo Ward with its divided areas in which "4-#-# Hongo" is included.

Figure 9:
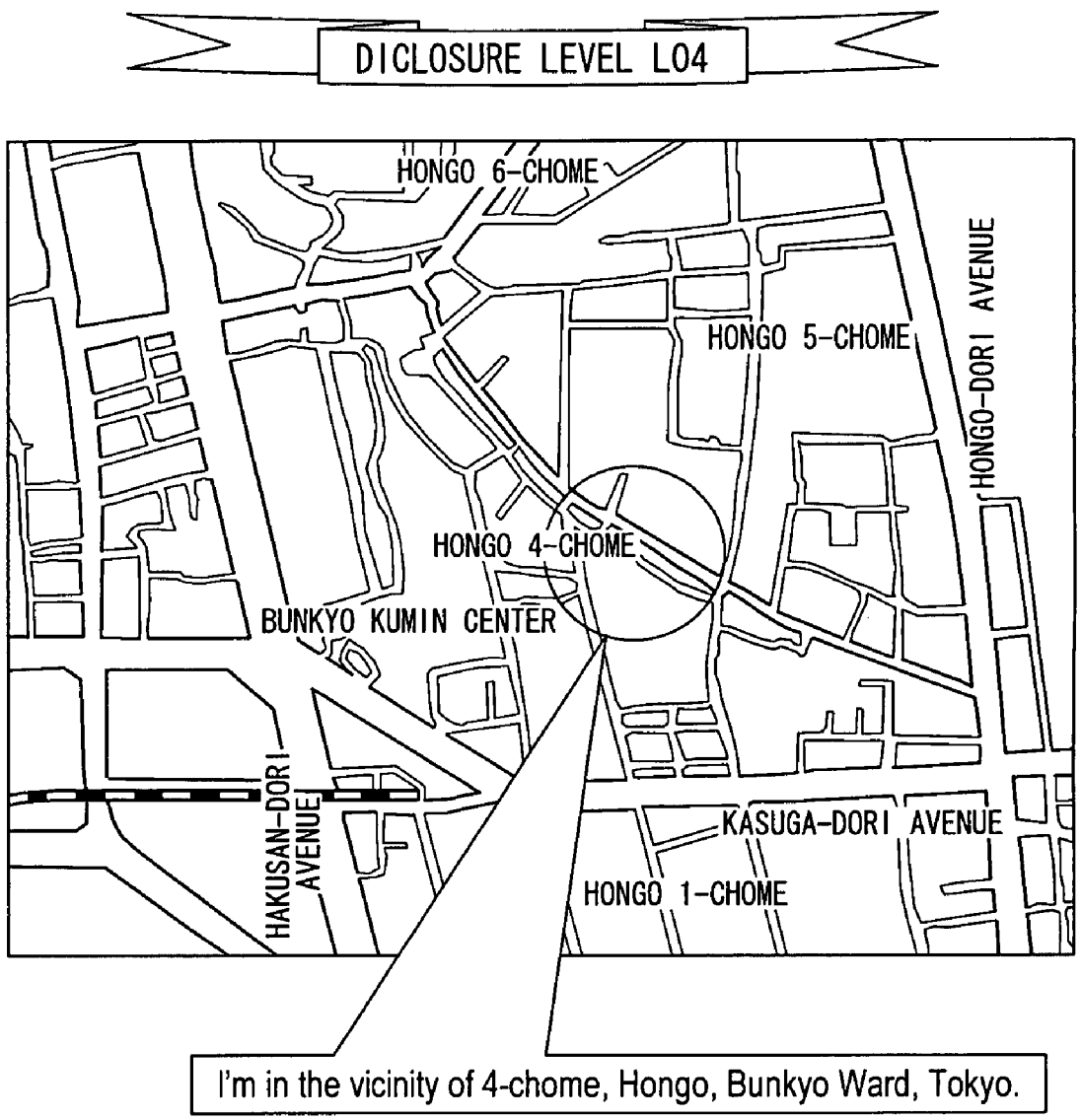
FIG. 9 shows a chart for the description of an example of location information and location display map information that are generated based on a disclosure level according to the present embodiment.

FIG. 9 shows another example in which the finally determined disclosure level L is L04, i.e., the municipality level. In this example, location information to be transmitted, "4-chome, Hongo, Bunkyo-Ward, Tokyo," in which the block number "#-#" omitted, is generated, and also location display map information to be transmitted is generated in which a circular location region with a diameter corresponding to 100 m that includes the block number "#-#" is indicated on a map of Hongo 4-chome with its divided areas.

Figure 10:
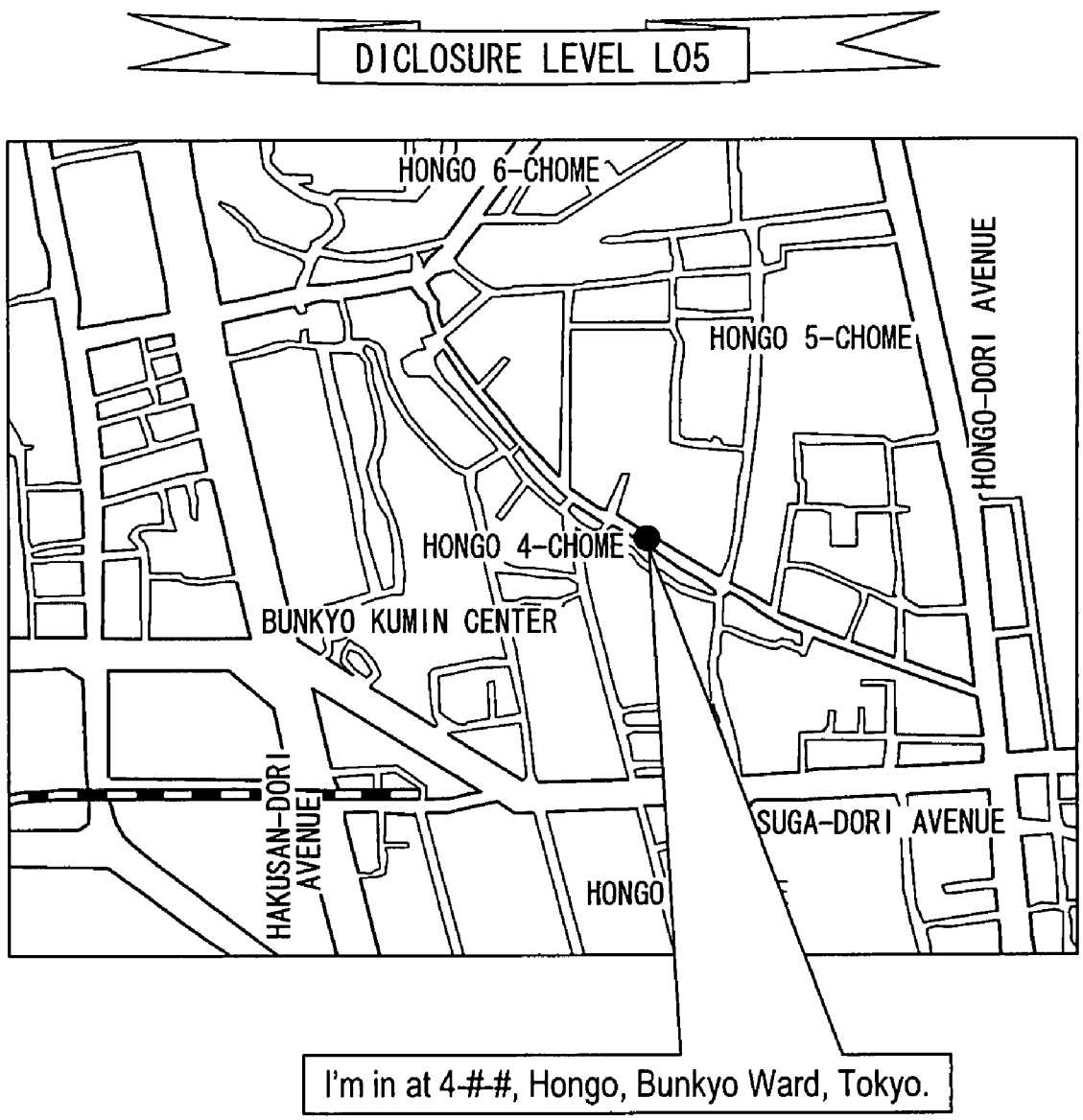
FIG. 10 shows a chart for the description of an example of location information and location display map information that are generated based on a disclosure level according to the present embodiment.

FIG. 10 shows another example in which the finally determined disclosure level L is L05, i.e., the pin-point basis within the community level. In this example, location information to be transmitted is generated on a pin-point basis, such as "4-#-# Hongo, Bunkyo Ward, Tokyo", and also location display map information to be transmitted is generated in which the block number "#-#" is shown on a pin-point basis on a map of Hongo 4-chome with its divided areas.

The thus generated location information and the location display map information are wirelessly transmitted from the mobile terminal 10 to the base station 60A. The information is further transmitted wirelessly via the network 61 of the carrier from the base station 60B to the communications terminal 50 of other party B, which is connected with the mobile terminal 10 on line.

In the communications terminal 50 of other party B, as its main control unit 20 detects the reception of the location information or the location display map information from user A in the transmission data received via the wireless antenna 54 and supplied from the wireless unit 15 and the communications control unit 16, stores the location information or the location display map information in the volatile memory (RAM) 22. The main control unit 20 further controls the display driver 23 so as to have the location information and the location display map information displayed on the display unit 13. Thus, the communications terminal 50 of other party B carries out a process for outputting the position information about user A (step SA14).

In this process for outputting the position information about user A, the means for the output of the location information is not limited to the display unit 13. For example, the main control unit 20 may employ the speaker 26 for voice announcement, such as messages "Disclosure not allowed," "In Tokyo," "In Bunkyo Ward, Tokyo," "Near Hongo, Bunkyo Ward, Tokyo," or "At 4-#-# Hongo, Bunkyo Ward, Tokyo," corresponding to the various disclosure levels L01 to L05.

Thus, in accordance with the present embodiment, the communications terminal 50 of other party B is notified of the position information about user A only at the disclosure level set by user A on the mobile terminal 10, thus ensuring the protection of privacy of user A.

The operation of the mobile terminal 10 of user A and that of the communications terminal 50 of user B are the same as in the case described with reference to FIG. 5 when, with respect to the location information or the position information of user A generated on the basis of the disclosure level L at which such information is to be transmitted to the other party, a time-band-based disclosure level or a located-area-based disclosure level is set in the disclosure level registration table 27 as shown for other parties B05 to B08 in FIG. 4, or when an other-party-based disclosure level, a time-band-based disclosure level, and a location-based disclosure level are set in an appropriate combination. Thus, the detailed description of such operations is omitted herein.

Furthermore, the mobile terminal 10 of the present embodiment is equipped with a disclosure level change notifying function whereby, if the application of the time-band-based disclosure level changes with the passage of time, or if the application of the location-based disclosure level changes due to movement, user A can be notified of such change in disclosure level.

For this purpose, when a time-band-based disclosure level or a location-based disclosure level is set uniformly in the disclosure level registration table 27 shown in FIG. 4 that are applied irrespective of other parties B01 to B08, for example, the main control unit 20 of the mobile terminal 10 carries out a process for acquiring the time counted in an internal timer or positioning data from the GPS reception unit 24 at predetermined time intervals. When the value of the time-band-based disclosure level or the location-based disclosure level changes depending on the thus acquired time counted or the positioning data, the main control unit 20 adapt the process for outputting its own position information to the other party to the changed disclosure level, and, using the light-emitting unit 19, the display unit 13, or the speaker 26, notifies user A of the fact that the disclosure level of its own position information has been changed.

Thus, user A can be made passively aware of the fact that the disclosure level, which is an indicator of the level of detail at which the other party is notified of his or her position information, has been changed due to the passage of time or movement.

Furthermore, in accordance with the mobile terminal 10 of the present embodiment, the location information or the location display map information shown in FIGS. 7 to 10 can be transmitted to a predetermined other party B registered in the disclosure level registration table 27 shown in FIG. 4 regardless of a position disclosure request therefrom in response to an operation on the operating unit 12 or based on the counting of a predetermined time by the internal timer as mentioned above, and in accordance with the time-band-based disclosure level or the located-area-based disclosure level that is set.

In this case, as shown in FIG. 5, when user A is the call requesting party, once a call request is made to other party B shown in step SA11, user A is allowed to carry out the process shown in step SA12 for acquiring its own position information regardless of the off-hooking on the part of the other party.

The mobile terminal 10 according to the present embodiment has been described with reference to FIG. 5, assuming that user A of the mobile terminal 10 is the call requesting party and other party B of the communications terminal 50 is the receiving (off-hook) party. However, the processes following steps SA12 and SB13 in FIG. 5 are applicable without any modification when other party B of the communications terminal 50 is the call requesting party and user A of the mobile terminal 10 is the receiving party. In addition, the process shown in FIG. 5 is not limited to the mode of communication based on a call request or a call reception (off-hook), but it is applicable to packet transmission or reception, such as mail, where no voice communication is involved.

In accordance with the mobile terminal 10 of the present embodiment, when generating the location display map information shown in FIGS. 7 to 9, it is possible to generate a located region such that the center point of the circle showing the located region of user A on the map is displaced from the point of the positioning data acquired by the GPS reception unit 24, by performing a predetermined operation on the operating unit 12.

In this way, even when notifying other party B of one's own location on a map, the center point of the circular located region is displaced from the actual location of user A, thereby further enhancing the protection of privacy.

Further, in accordance with the mobile terminal 10 of the present embodiment, by operating the operating unit 12 in a predetermined manner, the recorded content of the history storage memory 28 shown in FIG. 6 is displayed on the display unit 13. In this way, the user can confirm the content of previous position disclosure requests from the other parties, or the content of location information or location display map information transmitted to the other parties with associated disclosure levels. User A is also allowed to change the disclosure level L that is once set.

The mobile terminal 10 and the communications terminal 50 of the present embodiment as described above may be modified in various ways.

For example, the communications terminal 50 may be fixed instead of mobile, such as the mobile terminal 10. The mobile terminal 10 is not limited to a cell phone equipped with the GPS positioning function and instead may be a PDA (Personal Digital Assistant), a laptop computer, or the like as long as it is portable and equipped with communications and positioning functions.

The positioning function is not limited to the GPS positioning function as in the foregoing embodiment, but may be provided by a PHS or the like, which can be positioned while it is in wireless communication with the base station 60, for example.

In accordance with the present embodiment, regarding the acquisition of location display map information, map information data may be retained by the mobile terminal (mobile terminal) 10 itself, such as in the case of a navigation unit having an information communications function, or it may be possessed by the terminal 50 of other party B.

The content of the location displayed on the display unit 13 of the mobile terminal 10 or on the display unit 53 of the communications terminal 50 is not limited to the above-described examples involving a circular located region shown on a map to indicate a location. For example, an area such as "Tokyo" or "Bunkyo Ward, Tokyo" may be shown on a map in a manner different from the other surrounding areas. Instead of using a map, an area may be defined in terms of the longitude and the latitude, or the specific address or name of a relevant location may be directly displayed in words.

In accordance with the foregoing embodiment, the mobile terminal 10 acquires map information based on the positioning data it acquired, and then generates location display map information. Alternatively, however, the mobile terminal 10 may transmit the positioning data it acquired to the communications terminal 50 as positioning location area data adapted to the disclosure level, and map information corresponding to such positioning location area data may be acquired on the part of the communications terminal 50 so as to generate location display map information.

Thus, in the above-described location notifying system for allowing the communications terminal 50, which can communicate with the mobile terminal 10 of the foregoing embodiment, to output the location of the mobile terminal 10, the portable terminal 10 includes all of the following means: the mobile terminal position acquiring means (corresponding to the GPS reception unit 24) for acquiring, based on an instruction (request) from either the mobile terminal 10 or the communications terminal 50, the position information about the mobile terminal 10; the notified disclosure level determination means (corresponding to main control unit 20 and the volatile memory 22 in which the disclosure level registration table is recorded) for determining the disclosure level at which the position information about the mobile terminal 10 acquired by the mobile terminal position acquiring means 24 is outputted by the communications terminal 50 for notification; and the notification position information generating means (corresponding to the main control unit 20) for generating, based on the disclosure level determined by the notified disclosure level determination means, notified position information regarding the mobile terminal that is to be outputted by the communications terminal 50 for notification. This is, however, just an example of the configuration of the location notifying system according to the invention and other configurations may be employed. For example, the mobile terminal position acquiring means, the notified disclosure level determination means, and the notification position information generating means may be all provided on the part of the base station (carrier) or a content provider.

In this case, the location of the mobile terminal 10 may be acquired by the base station (carrier) from the GPS reception unit 24 of the mobile terminal 10. Alternatively, it may be obtained by the base station (carrier) based on a cell search of the mobile terminal 10, for example.

Thus, in accordance with the location notifying system of the invention, the notification position information generating means in particular may be provided on the part of either the mobile terminal 10, the base station (carrier), the content provider, or the communications terminal 50.

In the mobile terminal 10 according to the present embodiment, the disclosure level L as a parameter that defines the level of detail with which other party B is notified of the position information about the mobile terminal 10 is set on the part of the mobile terminal 10, which is the position information providing party, by a predetermined setting operation on the operating unit 12 of the mobile terminal 10 performed by user A in advance with respect to each communications terminal 50 of user B, with respect to a time band or a location area that is set and registered in advance, or with respect to an appropriate combination of the communications terminal 50, time band, and location area. Alternatively, however, it is also possible to set the disclosure level for position information intended for specific other party, such as the police, ambulance, fire department, or a particular household, automatically and externally, in response to the initiation of a call to such parties or based on a request from such parties, instead of the predetermined setting operation performed on the operating unit 12.

In this way, by setting the disclosure level for emergency calls for specific other parties, such as the police, ambulance, fire department, or specific household, on the part of the base station (carrier) or such specific other parties, it becomes possible to acquire the position information appropriately in case of emergency.

In the aforementioned configuration, the disclosure level L of position information about the mobile terminal 10 of user A is allowed to be set on the call-receiving end, i.e., the communications terminal 50 on the part of specific other parties B only when user A made a call to such specific other parties, such as the police, ambulance, fire department, or household. However, the setting of disclosure level L of the position information about the mobile terminal 10 of user A may also be changed by a special call made by specific other party B to the mobile terminal 10 of user A.

In this case, a configuration is adopted such that user A performs a predetermined setting operation on the operating unit 12 so as to register in advance in the disclosure level determination means or the like in the mobile terminal 10 conditions under which specific other party B alone is allowed to change the setting of disclosure level L of user A's position information. For example, user A registers the ID information (such as the telephone number of the call-originating source) about the communications terminal 50 of a specific other party B as an allowed terminal. User A then registers conditions under which the change of settings, such as the password, is allowed, in the disclosure level determination means or the like in advance in association with the ID information about such allowed terminal. The conditions for allowing the change in the settings include password information and a valid/invalid condition with respect to the password information based on the time or area or the like. Such specific other parties B are informed about preset password information beforehand.

Thus, the mobile terminal 10 of user A, upon reception of a disclosure request for position information about user A from the communications terminal 50 on the part of a specific other party B, makes sure that the disclosure request is from the communications terminal 50 of specific other party B based on the telephone number of the call-originating source, and then prompts the communications terminal 50 of the specific other party B to supply relevant password information. In response, the specific other party B operates the operating unit of the communications terminal 50 and enters the predetermined password information. Once the mobile terminal 10 of user A makes sure that the supplied password information corresponds to predetermined password information registered in advance, it further confirms the valid/invalid condition and then supplies the location information about user A at the disclosure level designated by the disclosure request.

In this way, it becomes possible to transmit the location information about user A to a specific other party B not just when making a call to the specific other party B but also in response to a disclosure request from the specific other party B in case of emergency or the like. In the above-described example, the ID information about the allowed terminal, which is used for identifying the communications terminal from which the call originated and the password information, which is used for identifying the specific other party B, are combined with the valid/invalid condition, which is used for the protection of privacy of user A. However, it is also possible to allow the specific other party B to change the disclosure level of the location information about user A under the condition concerning either ID information, which is used for identifying the call-originating communications terminal, or the password information, which is used for identifying the specific other party B. In this way, it becomes possible to change the disclosure level to a more detailed level on the part of the communications terminal. This feature is also useful when, for example, searching for one's own terminal when one has lost it.

The disclosure level L may be set in various other ways.

For example, as mentioned above, when notifying other party B of the location of user A by referring to a map based on the reception of a position disclosure request from other party B, the notified position information about user A may be made once public in response to the position disclosure request from the communications terminal 50 of other party B. Then, if there is another position disclosure request from the same other party B in a consecutive manner, the notified position information about user A may be disclosed to the other party B under the same condition as before as long as predetermined specific conditions are met.

Specifically, it is now assumed that a configuration is adopted such that, by performing a predetermined operation on the operating unit 12 in advance as described above, a located area is generated in response to the initial position disclosure request from the communications terminal 50 of the other party B such that the central point of the circular located area of user A on a map is displaced from point P on the positioning data acquired from the GPS reception unit 24, and then other party B is notified of the located area as the notified position information. Thereafter, upon receiving another position disclosure request from the same other terminal B in a consecutive manner, if other party B is notified of position information such that the circular located area shown on a map is different from the initial one due to the displacement from the point on the positioning data, despite the fact that the location of party A has not changed and the point on the positioning data has not changed, there is the possibility that the location of user A could be known to the other party B against the will of user A and with higher accuracy than that of the disclosure level set in advance, based on the difference between the circular located area shown in the map in the previously disclosed notified position information and the circular located area shown on the map in the lately disclosed notified position information.

Figure 11:
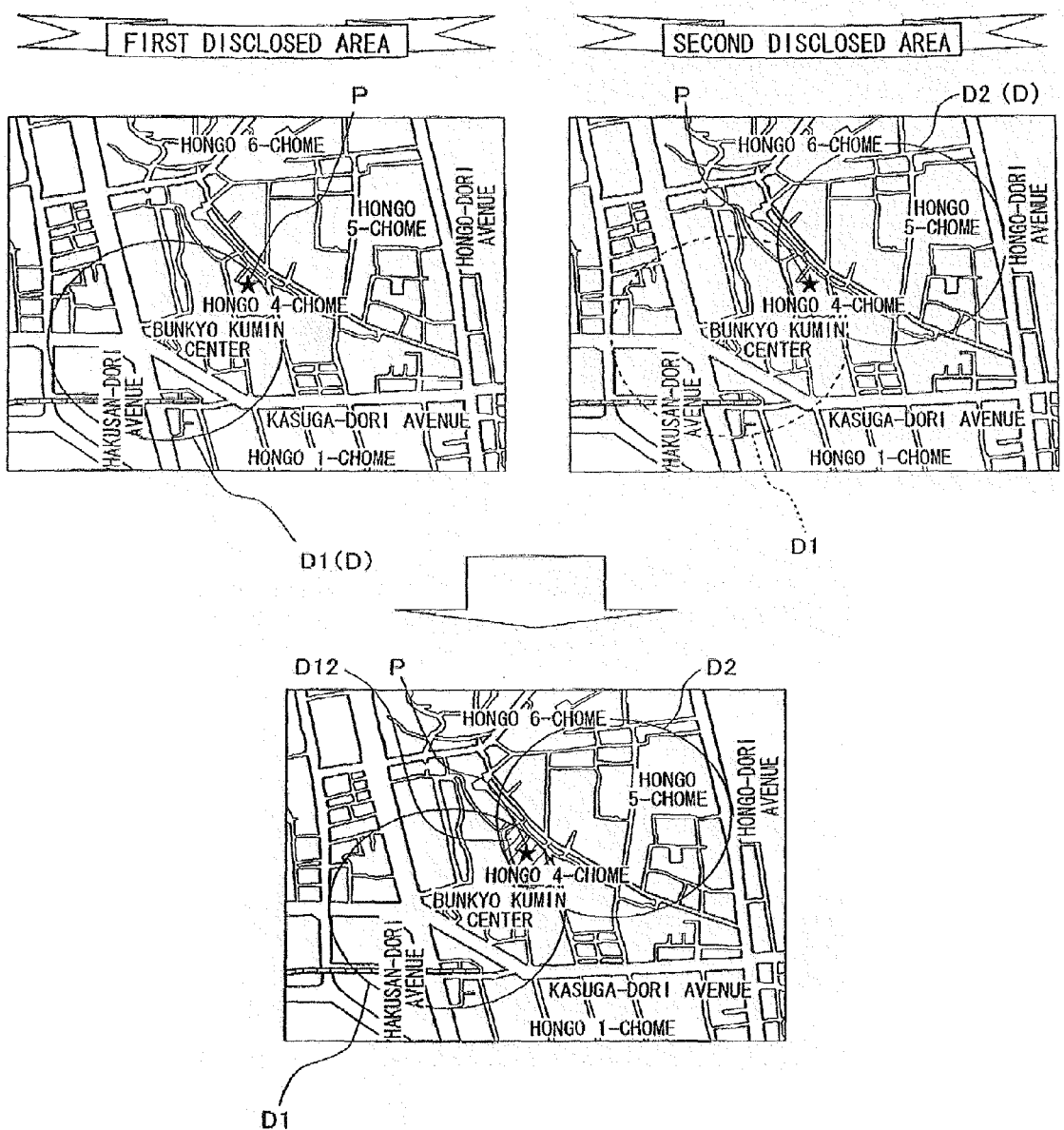
FIG. 11 shows drawings for the explanation of a phenomenon in which the location of user A becomes known to other party B with a level of accuracy higher than a preset disclosure level.

FIG. 11 shows drawings for the explanation of this phenomenon, where the location of user A becomes known to other party B with higher accuracy than that of the disclosure level that is set in advance.

As shown in FIG. 11, despite the fact that the location of user A remains the same and point P on the positioning data also remains the same, if the circular located area (position information about user A that is disclosed to other party B) D shown on the map that is generated by displacing from point P on the positioning data is created as regions D1 and D2 for the first and second position disclosure requests, the fact that user A is located within a region D12 where regions D1 and D2 overlap would be known to other party B with a substantially more detailed disclosure level than the set disclosure level.

On the other hand, if user A is moving, regardless of whether or not the center point of the circular located area indicating the location of user A on the map is displaced from the point on the positioning data acquired by the GPS reception unit 24, after the located area of user A is disclosed to other party B in response to the initial position disclosure request from the communications terminal 50 of other party B, if the notified position information about user A is disclosed unconditionally each time a position disclosure request is made by the communications terminal 50 of the same other party B in a repeated manner, there is the possibility that the detailed track of movement of user A could become known to other party B against the will of user A.

Figure 12:
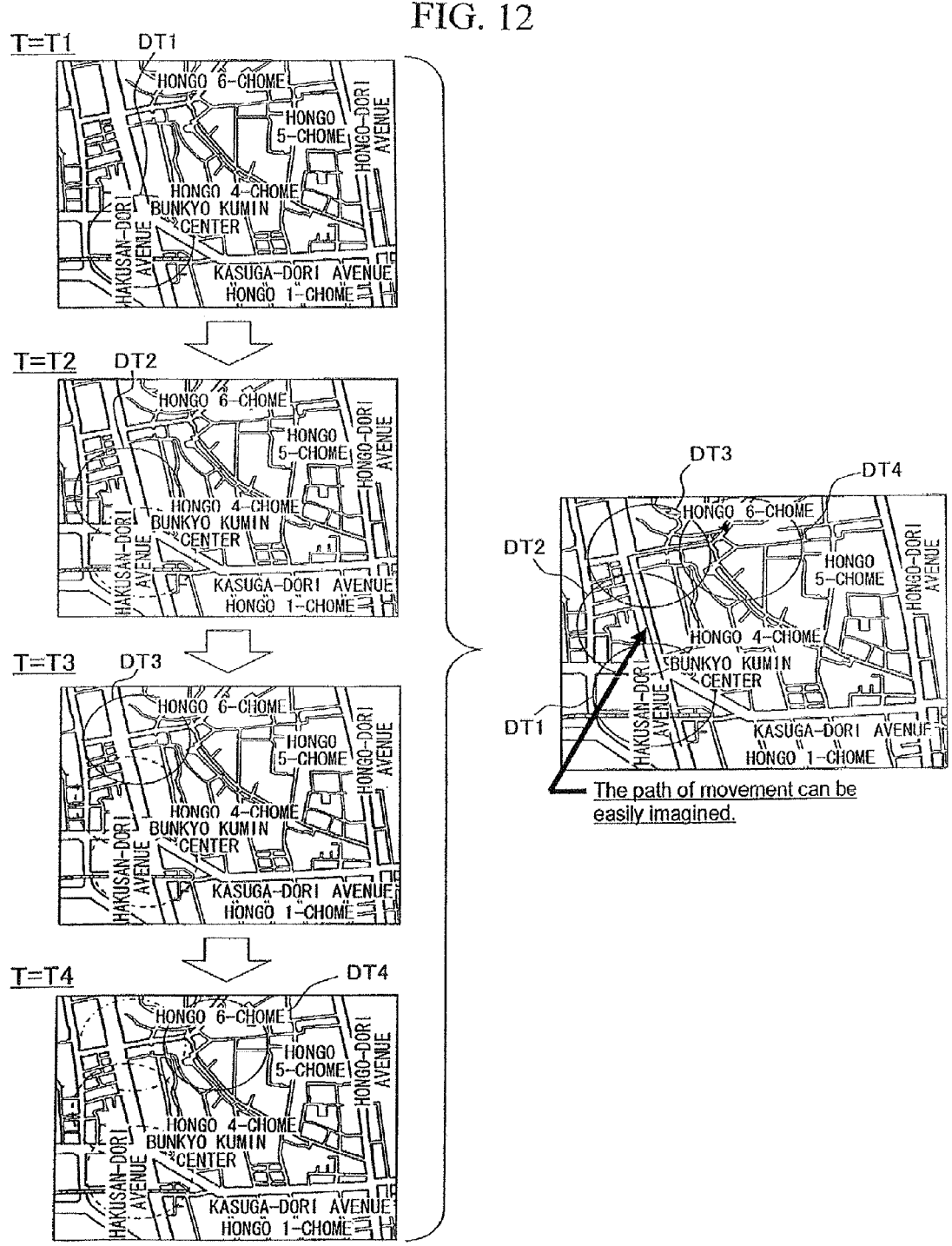
FIG. 12 shows drawings for the explanation of a phenomenon in which the detailed path of movement of user A becomes known to other party B against the will of user A.

FIG. 12 shows drawings for the explanation of the phenomenon, where the detailed track of movement of user A becomes known to other party B against the will of user A.

In FIG. 12, T1 to T4 show the time T of disclosure of the notified position information by the mobile terminal 10 of user A to other party B in response to disclosure requests repeatedly made by the communications terminal 50 of the same other party B. DT1 to DT4 show examples of the content of the located region of user A shown on a map based on the notified position information disclosed to the other party B at the times T1 to T4.

In this case, too, if the position disclosure request is repeated frequently by the communications terminal 50, the interval of disclosure of the notified position information made by the mobile terminal 10 of user A to the other party B becomes shorter. As a result, other party B would be able to learn the detailed track DD of movement of user A by superposing the located regions DT1 to DT4 of user A shown on a map based on the notified position information at the individual times T1 to T4, against the will of user A.

In order to solve this problem, the main control unit 20 of the mobile terminal 10 implements additional specific conditions when performing the processes described with reference to FIG. 5, i.e., the process for acquiring one's own position information in step SA12, the process for determining one's own disclosure level with respect to other party B in step SA13, and the process for outputting one's own position information based on the thus determined disclosure level to the other party's terminal 50 in step SA14.

For example, upon reception of the latest position disclosure request from other party B, if a predetermined time that is set in advance by user A has not elapsed since the time of reception of the previous position disclosure request from the same other party B as obtained by referring to the recorded content in the history storage memory 28 shown in FIG. 6, the same content of notified position information as in the previous case is disclosed to the other party B under the same disclosure conditions (i.e., range of disclosure) as for the reception of the previous position disclosure request. In this way, the aforementioned problem can be easily solved.

Alternatively, in order to solve the aforementioned problem, a configuration may be employed such that, for example, based on the reception of the latest position disclosure request from other party B, it is determined whether or not the position information acquired by the process for acquiring one's own position information in step SA12 is still within the located area D shown in the map according to the notified position information disclosed to the other party in response to the reception of the immediately preceding position disclosure request, regardless of the latest other party B. If the position information is still within the located area D, the same content of notified position information is disclosed to the other party B under the same disclosure conditions (i.e., range of disclosure) as those for the immediately preceding reception of the position disclosure request.

The process for dealing with the reception of a position disclosure request from the same other party B before the predetermined time elapses, and the process for dealing with the case where one's own position information is still within the located area D shown on a map according to the notified position information disclosed to the other party in response to the reception of the immediately preceding position disclosure request, may be performed individually or in combination.

By additionally performing the aforementioned processes, it becomes possible to decrease the granularity of the level of detail of the position information (i.e., the granularity of the position information disclosed to the other party or the frequency of such disclosure) of which the other party is notified concerning the location of user A of the mobile terminal 10, thereby further enhancing the protection of privacy.

Similar measures can be taken in the case where, as described above, notified position information in accordance with the time-band-based disclosure level or the location-based disclosure level is transmitted to a predetermined other party B registered in the disclosure level registration table 27 shown in FIG. 4 based on the counting of a predetermined time by the internal timer in the mobile terminal 10 of user A, regardless of a position disclosure request from the other party B. For example, user A may be allowed to change the setting of the predetermined time counted by the internal timer by operating the operating unit 12 in advance. In this case, the disclosure level of the position information about user A of which the other party B is notified may be adjusted depending on the time-band-based disclosure level, and also the frequency of such notification to the other party B within such time band may be adjusted depending on the predetermined time counted by the internal timer.

INDUSTRIAL APPLICABILITY

In accordance with the invention, the level of detail of the position information indicating one's own location can be specified by the user of a mobile terminal in terms of disclosure levels depending on the other party to which one's location is disclosed. This makes it possible to prevent the supply of the position information about one's location more than is necessary to the other party. In this way, privacy can be protected. On the other hand, when it is necessary to provide detailed information about one's location to the other party, such as in case of emergency, the other party can be provided with all the necessary detailed information about one's location, thereby contributing to the rapid handling of cases of emergency or the like.

Furthermore, in accordance with the invention, the user of the mobile terminal can control the disclosure of the information about his or her location depending on the location area or the time band, even to those other parties who are normally notified of the user's location. In this way, the disclosure of information about one's location to the other party can be limited, thus contributing to the protection of privacy.

The invention claimed is:

1. A mobile terminal having a communications function, comprising:
  a first terminal position information acquiring unit acquiring position information about a first terminal;
  a disclosure request reception unit receiving a disclosure request for the position information about the first terminal, the disclosure request being transmitted from a second terminal and including a requested disclosure level;
  a disclosure level determination unit determining the disclosure level of the position information about the first terminal that is acquired by the first terminal position information acquiring unit in accordance with the disclosure request received by the disclosure request reception unit; and
  an output unit comprising a map information storage unit in which map information is stored, the output unit outputting to the second terminal the position information about the first terminal based on the disclosure level determined by the disclosure level determination unit, wherein
  the first terminal is the mobile terminal itself, and the second terminal is another terminal that is capable of communicating with the mobile terminal, and
  the output unit outputs the position information about the first terminal based on the disclosure level determined by the disclosure level determination unit, the position information about the first terminal being outputted, based on the map information stored in the map information storage unit, in such a manner that location display map information about a location is displayed at the second terminal.

2. A mobile terminal having a communications function, comprising:
  a first terminal position information acquiring unit acquiring position information about a first terminal;
  a disclosure request reception unit receiving a disclosure request for the position information about the first terminal, the disclosure request being transmitted from a second terminal and including a requested disclosure level;
  a disclosure level determination unit determining the disclosure level of the position information about the first terminal that is acquired by the first terminal position information acquiring unit in accordance with the disclosure request received by the disclosure request reception unit; and
  an output unit comprising a map information acquiring unit acquiring map information from a server that is capable of establishing a communication connection with the first terminal, the output unit outputting to the second terminal the position information about the first terminal based on the disclosure level determined by the disclosure level determination unit, wherein
  the first terminal is the mobile terminal itself, and the second terminal is another terminal that is capable of communicating with the mobile terminal, and
  the output unit outputs the position information about the first terminal based on the disclosure level determined by the disclosure level determination unit, the position information about the first terminal being outputted in such a manner that the map information acquiring unit acquires, from the server capable of establishing a communication connection with the first terminal, map information including the position information about the first terminal and location display map information about a location is displayed at the second terminal.

3. A mobile terminal having a communications function, comprising:
  a first terminal position information acquiring unit acquiring position information about a first terminal;
  a disclosure request reception unit receiving a disclosure request for the position information about the first terminal, the disclosure request being transmitted from a second terminal and including a requested disclosure level;
  a disclosure level determination unit determining the disclosure level of the position information about the first terminal that is acquired by the first terminal position information acquiring unit in accordance with the disclosure request received by the disclosure request reception unit;
  an output unit outputting to the second terminal the position information about the first terminal based on the disclosure level determined by the disclosure level determination unit; and
  a second terminal based disclosure level storage unit recording the disclosure levels of the position information about the first terminal in association with terminal information about the respective second terminals that transmit a disclosure request, wherein
  the first terminal is the mobile terminal itself, and the second terminal is another terminal that is capable of communicating with the mobile terminal, and
  the disclosure level determination unit determines the disclosure level of the position information about the first terminal in further accordance with the recorded content of the second terminal based disclosure level storage unit and the terminal information about the second terminal that transmitted the disclosure request received by the disclosure request reception unit.

4. A mobile terminal having a communications function, comprising:
  a first terminal position information acquiring unit acquiring position information about a first terminal;
  a disclosure request reception unit receiving a disclosure request for the position information about the first terminal, the disclosure request being transmitted from a second terminal and including a requested disclosure level;
  a disclosure level determination unit determining the disclosure level of the position information about the first terminal that is acquired by the first terminal position information acquiring unit in accordance with the disclosure request received by the disclosure request reception unit;
  an output unit outputting to the second terminal the position information about the first terminal based on the disclosure level determined by the disclosure level determination unit; and
  a disclosure level setting unit registering the setting of the disclosure level of the position information about the first terminal, wherein
  the first terminal is the mobile terminal itself, and the second terminal is another terminal that is capable of communicating with the mobile terminal, and
  in the event that the disclosure level of the position information about the first terminal is registered by the disclosure level setting unit, the disclosure level determination unit determines the disclosure level of the position information about the first terminal in accordance with an input disclosure level registered by the disclosure level setting unit.

5. A mobile terminal having a communications function, comprising:
a first terminal position information acquiring unit acquiring position information about a first terminal;
a disclosure request reception unit receiving a disclosure request for the position information about the first terminal, the disclosure request being transmitted from a second terminal and including a requested disclosure level;
a disclosure level determination unit determining the disclosure level of the position information about the first terminal that is acquired by the first terminal position information acquiring unit in accordance with the disclosure request received by the disclosure request reception unit;
an output unit outputting to the second terminal the position information about the first terminal based on the disclosure level determined by the disclosure level determination unit; and
a requested disclosure level confirmation unit displaying on a display unit of the first terminal the requested disclosure level included in the disclosure request received by the disclosure request reception unit from the second terminal, wherein
the first terminal is the mobile terminal itself, and the second terminal is another terminal that is capable of communicating with the mobile terminal, and
the disclosure level determination unit determines the request disclosure level from the second terminal to be the disclosure level of the position information about the first terminal with respect to the second terminal based on an approval of the requested disclosure level from the second terminal displayed on the display unit of the first terminal by the requested disclosure level confirmation unit.

6. A mobile terminal having a communications function, comprising:
a first terminal position information acquiring unit acquiring position information about a first terminal;
a disclosure request reception unit receiving a disclosure request for the position information about the first terminal, the disclosure request being transmitted from a second terminal and including a requested disclosure level;
a disclosure level determination unit determining the disclosure level of the position information about the first terminal that is acquired by the first terminal position information acquiring unit in accordance with the disclosure request received by the disclosure request reception unit;
an output unit outputting to the second terminal the position information about the first terminal based on the disclosure level determined by the disclosure level determination unit;
a requested disclosure level confirmation unit displaying on a display unit of the first terminal the requested disclosure level included in the disclosure request received by the disclosure request reception unit from the second terminal; and
a requested disclosure level changing unit changing the setting of the requested disclosure level from the second terminal based on a disapproval of the requested disclosure level from the second terminal displayed on the display unit of the first terminal by the requested disclosure level confirmation unit, wherein
the first terminal is the mobile terminal itself, and the second terminal is another terminal that is capable of communicating with the mobile terminal, and
the disclosure level determination unit, when the setting of the requested disclosure level from the second terminal is changed by the requested disclosure level changing unit, determines the disclosure level whose setting has been changed to be the disclosure level of the position information about the first terminal with respect to the second terminal.

7. A mobile terminal having a communications function, comprising:
a first terminal position information acquiring unit acquiring position information about a first terminal;
a disclosure request reception unit receiving a disclosure request for the position information about the first terminal, the disclosure request being transmitted from a second terminal and including a requested disclosure level;
a disclosure level determination unit determining the disclosure level of the position information about the first terminal that is acquired by the first terminal position information acquiring unit in accordance with the disclosure request received by the disclosure request reception unit;
an output unit outputting to the second terminal the position information about the first terminal based on the disclosure level determined by the disclosure level determination unit; and
a disclosure information confirmation unit displaying on a display unit of the first terminal the disclosure level determined by the disclosure level determination unit, or the position information about the first terminal that is displayed at the second terminal based on the disclosure level, wherein
the first terminal is the mobile terminal itself, and the second terminal is another terminal that is capable of communicating with the mobile terminal, and
the position information about the first terminal displayed on the display unit of the first terminal by the disclosure information confirmation unit comprises location address information or location display map information about the first terminal based on the disclosure level determined by the disclosure level determination unit.

8. A mobile terminal having a communications function, comprising:
a first terminal position information acquiring unit acquiring position information about a first terminal;
a disclosure request reception unit receiving a disclosure request for the position information about the first terminal, the disclosure request being transmitted from a second terminal and including a requested disclosure level;
a disclosure level determination unit determining the disclosure level of the position information about the first terminal that is acquired by the first terminal position information acquiring unit in accordance with the disclosure request received by the disclosure request reception unit;
an output unit outputting to the second terminal the position information about the first terminal based on the disclosure level determined by the disclosure level determination unit; and
a disclosure information confirmation unit displaying on a display unit of the first terminal the disclosure level determined by the disclosure level determination unit, or the position information about the first terminal that is displayed at the second terminal based on the disclosure level, wherein the first terminal is the mobile terminal itself, and the second terminal is another terminal that is capable of communicating with the mobile terminal, and the output unit outputs to the second terminal the position information about the first terminal based on the disclosure level determined by the disclosure level determination unit based on an approval of the disclosure level confirmed by the disclosure information confirmation unit, or an approval of location address information or location display map information about the first terminal as the position information about the first terminal displayed at the second terminal based on the disclosure level.

9. A mobile terminal having a communications function, comprising:

a first terminal position information acquiring unit acquiring position information about a first terminal;

a disclosure request reception unit receiving a disclosure request for the position information about the first terminal, the disclosure request being transmitted from a second terminal and including a requested disclosure level;

a disclosure level determination unit determining the disclosure level of the position information about the first terminal that is acquired by the first terminal position information acquiring unit in accordance with the disclosure request received by the disclosure request reception unit;

an output unit outputting to the second terminal the position information about the first terminal based on the disclosure level determined by the disclosure level determination unit, wherein the first terminal is the mobile terminal itself, and the second terminal is another terminal that is capable of communicating with the mobile terminal, the output unit outputs the position information about the first terminal based on the disclosure level determined by the disclosure level determination unit, the position information about the first terminal being outputted in such a manner that location display map information about a location is displayed at the second terminal, and the position information about the first terminal based on a disclosure level that is outputted by the output unit to the second terminal comprises location range information that includes within a location range the position information about the first terminal that is acquired by the first terminal position information acquiring unit, wherein the setting of the size of the location range is variable depending on the disclosure level determined by the disclosure level determination unit.

10. The mobile terminal according to claim 9, wherein, when the output unit outputs the position information about the first terminal based on the disclosure level and causes the location display map information of the location to be displayed at the second terminal, the position information about the first terminal acquired by the first terminal position information acquiring unit coincides with central position information in the location range of the first terminal displayed on the location display map at the second terminal based on the location range information.

11. The mobile terminal according to claim 9, wherein, when the output unit outputs the position information about the first terminal based on the disclosure level and causes the location display map information of the location to be displayed at the second terminal, the position information about the first terminal acquired by the first terminal position information acquiring unit does not coincide with central position information in the location range of the first terminal displayed on the location display map at the second terminal based on the location range information.

12. A mobile terminal having a communications function, comprising:

a first terminal position information acquiring unit acquiring position information about a first terminal;

a disclosure request reception unit receiving a disclosure request for the position information about the first terminal, the disclosure request being transmitted from a second terminal;

a disclosure level determination unit determining the disclosure level of the position information about the first terminal in accordance with the disclosure request received by the disclosure request reception unit and in accordance with a location area based on the position information about the first terminal acquired by the first terminal position information acquiring unit;

an output unit outputting to the second terminal the position information about the first terminal based on the disclosure level determined by the disclosure level determination unit;

an area-based disclosure level storage unit recording the disclosure level of the position information about the first terminal in association with located areas; and a disclosure level setting unit registering in the area-based disclosure level storage unit the setting of the located area of the first terminal in accordance with a predetermined disclosure level, wherein the first terminal is the mobile terminal itself, and the second terminal is another terminal that is capable of communicating with the mobile terminal, and the disclosure level determination unit, when the position information about the first terminal acquired when the disclosure request reception unit received the disclosure request is included within a located area that is registered in the area-based disclosure level storage unit, determines the disclosure level of the position information about the first terminal to be the predetermined disclosure level associated with the located area in which the position information about the first terminal is included in accordance with the recorded content in the area-based disclosure level storage unit and the located area based on the position information about the first terminal acquired when the disclosure request reception unit received the disclosure request.

13. The mobile terminal according to claim 12, wherein the predetermined disclosure level is such a disclosure level that the output unit is permitted to output the position information about the first terminal to the second terminal.

14. The mobile terminal according to claim 12, wherein the predetermined disclosure level is such a disclosure level that the output unit is prohibited from outputting the position information about the first terminal to the second terminal.

15. A mobile terminal having a communications function, comprising:

a first terminal position information acquiring unit acquiring position information about a first terminal;

a disclosure request reception unit receiving a disclosure request for the position information about the first terminal, the disclosure request being transmitted from a second terminal;

a disclosure level determination unit determining, in accordance with a time band in which the disclosure request is received, a disclosure level of the position information about the first terminal, which is acquired by the first terminal position information acquiring unit in accordance with the disclosure request received by the disclosure request reception unit;

an output unit outputting to the second terminal the position information about the first terminal based on the disclosure level determined by the disclosure level determination unit;

a time-band-based disclosure level storage unit recording the disclosure levels of the position information about the first terminal in association with the time band in which the disclosure request is received; and a disclosure level setting unit registering the setting of a time band associated with a predetermined disclosure level in the time-band-based disclosure level storage unit, wherein the first terminal is the mobile terminal itself, and the second terminal is another terminal that is capable of communicating with the mobile terminal, and the disclosure level determination unit determines, when the reception time at which the disclosure request reception unit received the disclosure request is within a time band range registered in the time-band-based disclosure level storage unit, the disclosure level of the position information about the first terminal to be a predetermined disclosure level associated with a time band within whose range the reception time is included in accordance with the recorded content in the time-band-based disclosure level storage unit based on the reception time at which the disclosure request reception unit received the disclosure request.

16. The mobile terminal according to claim 15, wherein the predetermined disclosure level is such a disclosure level that the output unit is permitted to output the position information about the first terminal to the second terminal.

17. The mobile terminal according to claim 15, wherein the predetermined disclosure level is such a disclosure level that the output unit is prohibited from outputting the position information about the first terminal to the second terminal.

18. The mobile terminal according to claim 15, further comprising:

a disclosure level change confirmation unit displaying on a display unit of the first terminal a change in the disclosure level whenever the disclosure level determined by the disclosure level determination unit is changed by the passage of time.

19. A mobile terminal having a communications function, comprising:

a disclosure request reception unit receiving a disclosure request for the position information about a first terminal, the disclosure request being transmitted from a second terminal;

a first terminal position information acquiring unit acquiring the position information about the first terminal based on the reception of the disclosure request by the disclosure request reception unit;

a disclosure level determination unit determining a disclosure level of the position information about the first terminal that is acquired by the first terminal position information acquiring unit in accordance with the disclosure request received by the disclosure request reception unit; and an output unit outputting to the second terminal the position information about the first terminal based on the disclosure level determined by the disclosure level determination unit:

a disclosure request judging unit determining whether or not the latest disclosure request received by the disclosure request reception unit is a repeated disclosure request from the same second terminal within a predetermined time interval; and an output control unit, wherein, based on the result of determination made by the disclosure request judging unit, if the latest disclosure request received is a repeated disclosure request from the same second terminal within the predetermined time interval range, the output control unit causes the output unit to output the same position information about the first terminal as the position information about the first terminal outputted to the second terminal from the output unit in response to the reception of the previous disclosure request, and wherein, if the latest disclosure request received is not a repeated disclosure request from the same second terminal within the predetermined time interval range, the output control unit causes the output unit to output new position information about the first terminal generated based on the position information about the first terminal acquired by the first terminal position information acquiring unit and the disclosure level determined by the disclosure level determination unit in accordance with the latest disclosure request received, and wherein the first terminal is the mobile terminal itself, and the second terminal is another terminal that is capable of communicating with the mobile terminal.

20. A mobile terminal having a communications function, comprising:

a disclosure request reception unit receiving a disclosure request for position information about a first terminal, the disclosure request being transmitted from a second terminal;

a first terminal position information acquiring unit acquiring the position information about the first terminal based on the reception of the disclosure request by the disclosure request reception unit;

a disclosure level determination unit determining the disclosure level of the position information about the first terminal that is acquired by the first terminal position information acquiring unit in accordance with the disclosure request received by the disclosure request reception unit;

an output unit outputting to the second terminal the position information about the first terminal based on the disclosure level determined by the disclosure level determination unit:

a position information judging unit determining whether or not the latest position information about the first terminal acquired by the first terminal position information acquiring unit based on the latest disclosure request received belongs to a location range of the position information about the first terminal based on a disclosure level outputted to the second terminal from the output unit based on a previously received disclosure request; and an output control unit, wherein, based on the result of determination made by the position information judging unit, if the latest position information belongs to a location range of the position information about the first terminal based on the disclosure level previously outputted from the output unit, the output control unit causes the output unit to output the same position information about the first terminal as the position information about the first terminal outputted to the second terminal from the output unit in response to the reception of the previous disclosure request, and wherein, if the latest position information does not belong to the location range of the position information about the first terminal based on the disclosure level previously outputted from the output unit, the output control unit causes, in accordance with the latest disclosure request received, the output unit to output new position information about the first terminal generated based on the latest position information and the disclosure level determined by the disclosure level generated by the first terminal position information acquiring unit and the disclosure level determination unit based on the latest disclosure request, and wherein the first terminal is the mobile terminal itself, and the second terminal is another terminal that is capable of communicating with the mobile terminal.

21. A mobile terminal having a communications function, comprising:
   a disclosure request reception unit receiving a disclosure request for position information about a first terminal, the disclosure request being transmitted from a second terminal;
   a first terminal position information acquiring unit acquiring the position information about the first terminal based on the reception of the disclosure request by the disclosure request reception unit;
   a disclosure level determination unit determining the disclosure level of the position information about the first terminal that is acquired by the first terminal position information acquiring unit in accordance with the disclosure request received by the disclosure request reception unit;
   an output unit outputting to the second terminal the position information about the first terminal based on the disclosure level determined by the disclosure level determination unit;
   an allowing condition storage unit storing a preset allowing condition allowing the second terminal to change the disclosure level of the position information about the first terminal; and
   a second terminal specific determination unit determining whether or not the second terminal from which the disclosure request reception unit received the disclosure request satisfies the allowing condition stored in the allowing condition storage unit,
   wherein if the second terminal specific determination unit determines that the allowing condition is satisfied, the disclosure level determination unit determines the disclosure level of the position information about the first terminal to be the disclosure level according to the disclosure request received by the disclosure request reception unit, and
   wherein the first terminal is the mobile terminal itself, and the second terminal is another terminal that is capable of communicating with the mobile terminal.

22. The mobile terminal according to claim 21, wherein the allowing condition stored in the allowing condition storage unit comprises a preset password.

* * * * *